United States Patent
Gould

(10) Patent No.: US 11,878,251 B2
(45) Date of Patent: Jan. 23, 2024

(54) METHOD OF SYNCHRONIZING ONLINE GAME, AND SERVER DEVICE

(71) Applicant: GREE, Inc., Tokyo (JP)

(72) Inventor: Robert Jay Gould, Minato-ku (JP)

(73) Assignee: GREE, INC., Tokyo (JP)

( * ) Notice: Subject to any disclaimer, the term of this patent is extended or adjusted under 35 U.S.C. 154(b) by 476 days.

(21) Appl. No.: 17/217,169

(22) Filed: Mar. 30, 2021

(65) Prior Publication Data

US 2021/0213359 A1     Jul. 15, 2021

Related U.S. Application Data

(63) Continuation of application No. 16/601,457, filed on Oct. 14, 2019, now Pat. No. 10,987,591, which is a
(Continued)

(51) Int. Cl.
*A63F 13/00*       (2014.01)
*A63F 13/77*       (2014.01)
(Continued)

(52) U.S. Cl.
CPC .............. *A63F 13/77* (2014.09); *A63F 13/35* (2014.09); *H04L 67/02* (2013.01);
(Continued)

(58) Field of Classification Search
None
See application file for complete search history.

(56) References Cited

U.S. PATENT DOCUMENTS

| | | | |
|---|---|---|---|
| 5,166,502 A | 11/1992 | Rendleman et al. | |
| 7,552,148 B2 * | 6/2009 | Liu | G06F 11/1435 714/24 |

(Continued)

FOREIGN PATENT DOCUMENTS

| | | |
|---|---|---|
| JP | 2001-265704 A | 9/2001 |
| JP | 2002-66139 A | 3/2002 |

(Continued)

OTHER PUBLICATIONS

Japanese Office Action dated Aug. 25, 2020 in Patent Application No. 2018-242439 (with English translation), 8 pages.
(Continued)

*Primary Examiner* — Paul A D'Agostino
(74) *Attorney, Agent, or Firm* — Maier & Maier, PLLC

(57) ABSTRACT

The present disclosure provides a method of synchronizing an online game, and a server device, that do not require centralized information management, reduce the processing burden on each device during online communication, and allow for continuation of processing in an offline environment. A method, according to the present disclosure, of synchronizing an online game that allows for transmission and reception of information related to game processing between a first client terminal and a second client terminal via a server includes: receiving, from the first client terminal connected online, first information related to game processing on the first client terminal; determining whether the first information is information that determines a game status; and storing the first information on the server and transmitting the first information to the second client terminal when the first information is determined to be information that determines the game status.

20 Claims, 22 Drawing Sheets

Related U.S. Application Data continuation of application No. 16/116,542, filed on Aug. 29, 2018, now Pat. No. 10,456,688, which is a continuation of application No. 15/812,000, filed on Nov. 14, 2017, now Pat. No. 10,080,968, which is a continuation of application No. 14/432,060, filed as application No. PCT/JP2013/077005 on Oct. 3, 2013, now Pat. No. 9,849,389.

(51) Int. Cl.
| | | |
|---|---|---|
| *H04L 67/55* | (2022.01) | |
| *A63F 13/35* | (2014.01) | |
| *H04L 67/02* | (2022.01) | |
| *H04L 67/1095* | (2022.01) | |
| *A63F 13/493* | (2014.01) | |

(52) U.S. Cl.
CPC .......... *H04L 67/1095* (2013.01); *H04L 67/55* (2022.05); *A63F 13/493* (2014.09); *A63F 2300/402* (2013.01); *A63F 2300/407* (2013.01); *A63F 2300/408* (2013.01); *A63F 2300/534* (2013.01); *A63F 2300/5533* (2013.01)

(56) References Cited

U.S. PATENT DOCUMENTS

| | | | |
|---|---|---|---|
| 7,803,054 B1* | 9/2010 | Ogus | A63F 13/12 463/31 |
| 8,812,856 B2 | 8/2014 | Tamma | |
| 9,224,259 B1 | 12/2015 | Miller et al. | |
| 10,080,968 B2 | 9/2018 | Gould | |
| 2002/0129096 A1 | 9/2002 | Mansour et al. | |
| 2002/0130040 A1 | 9/2002 | Baldwin | |
| 2002/0194269 A1 | 12/2002 | Owada et al. | |
| 2003/0007464 A1 | 1/2003 | Balani | |
| 2003/0171986 A1 | 9/2003 | Itkis et al. | |
| 2003/0220136 A1 | 11/2003 | Soltys et al. | |
| 2004/0029638 A1 | 2/2004 | Hytcheson et al. | |
| 2005/0054445 A1 | 3/2005 | Gatto et al. | |
| 2006/0004874 A1 | 1/2006 | Hutcheson et al. | |
| 2006/0035707 A1 | 2/2006 | Nguyen et al. | |
| 2006/0121989 A1 | 6/2006 | O'Kelley et al. | |
| 2006/0121992 A1* | 6/2006 | Bortnik | A63F 13/35 463/43 |
| 2006/0247051 A1 | 11/2006 | Liu | |
| 2007/0021216 A1 | 1/2007 | Guruparan | |
| 2007/0047586 A1* | 3/2007 | Tieman | H04L 65/612 370/486 |
| 2007/0054716 A1 | 3/2007 | Hiruta | |
| 2007/0087791 A1 | 4/2007 | Feeney et al. | |
| 2007/0173327 A1 | 7/2007 | Kilgore et al. | |
| 2007/0218980 A1 | 9/2007 | Pachnis et al. | |
| 2008/0020814 A1 | 1/2008 | Kernene | |
| 2008/0070703 A1 | 3/2008 | Campo et al. | |
| 2008/0076573 A1 | 3/2008 | Loehrer | |
| 2008/0109727 A1* | 5/2008 | Colle | H04N 21/43072 719/328 |
| 2008/0147781 A1* | 6/2008 | Hopmann | H04L 67/1095 709/203 |
| 2008/0205330 A1* | 8/2008 | Stadler | H04L 69/22 370/328 |
| 2008/0220878 A1 | 9/2008 | Michaelis | |
| 2008/0270513 A1 | 10/2008 | Fujiwara et al. | |
| 2008/0320025 A1 | 12/2008 | Ozzie et al. | |
| 2009/0013027 A1 | 1/2009 | Tanaka | |
| 2009/0075725 A1 | 3/2009 | Koyama | |
| 2009/0215538 A1 | 8/2009 | Jew | |
| 2009/0299960 A1 | 12/2009 | Lineberger | |
| 2009/0307284 A1* | 12/2009 | Welingkar | G06F 21/10 |
| 2010/0069149 A1* | 3/2010 | Kisenwether | G06Q 10/10 463/26 |
| 2010/0113159 A1 | 5/2010 | Chapman et al. | |
| 2010/0190549 A1 | 7/2010 | Park et al. | |
| 2010/0275229 A1* | 10/2010 | Civanlar | H04N 21/4384 725/39 |
| 2010/0302961 A1* | 12/2010 | Timmers | H04W 52/50 370/252 |
| 2011/0014984 A1 | 1/2011 | Penman et al. | |
| 2011/0028203 A1 | 2/2011 | Agarwal et al. | |
| 2011/0028219 A1* | 2/2011 | Heatherly | A63F 13/428 463/42 |
| 2011/0223996 A1 | 9/2011 | Yerli et al. | |
| 2011/0265119 A1 | 10/2011 | Jeong et al. | |
| 2011/0275432 A1 | 11/2011 | Lutnick et al. | |
| 2011/0280214 A1 | 11/2011 | Lee et al. | |
| 2012/0040692 A1 | 2/2012 | Baba | |
| 2012/0122552 A1 | 5/2012 | Youm | |
| 2012/0165100 A1 | 6/2012 | Lalancette et al. | |
| 2012/0172132 A1 | 7/2012 | Molyneaux et al. | |
| 2012/0190453 A1 | 7/2012 | Skaff et al. | |
| 2012/0295686 A1 | 11/2012 | Lockton | |
| 2013/0053150 A1 | 2/2013 | Miller et al. | |
| 2013/0178281 A1* | 7/2013 | Ayyar | A63F 13/69 463/30 |
| 2013/0183021 A1 | 7/2013 | Osman | |
| 2013/0217501 A1 | 8/2013 | Bruno, Jr. et al. | |
| 2013/0244784 A1 | 9/2013 | Assa | |
| 2013/0260885 A1 | 10/2013 | Beyr et al. | |
| 2013/0260887 A1 | 10/2013 | Cahill et al. | |
| 2013/0260888 A1 | 10/2013 | Thornton et al. | |
| 2013/0316797 A1 | 11/2013 | Gelinotte et al. | |
| 2014/0038721 A1 | 2/2014 | Archer et al. | |
| 2014/0243086 A1 | 8/2014 | Yang et al. | |
| 2015/0111643 A1 | 4/2015 | Olofsson et al. | |
| 2015/0209670 A1 | 7/2015 | Furumoto et al. | |
| 2015/0238867 A1* | 8/2015 | Gould | H04L 67/1095 463/42 |
| 2018/0350191 A1 | 12/2018 | Shigeta | |

FOREIGN PATENT DOCUMENTS

| | | |
|---|---|---|
| JP | 2003-6127 A | 1/2003 |
| JP | 2003-258813 A | 9/2003 |
| JP | 2003-260272 A | 9/2003 |
| JP | 2006-288769 A | 10/2006 |
| JP | 2007-98063 A | 4/2007 |
| JP | 2007-160001 A | 6/2007 |
| JP | 200024315 A | 1/2020 |
| WO | 01/57678 A1 | 8/2001 |
| WO | 2010/119866 A1 | 10/2010 |

OTHER PUBLICATIONS

Japanese Office Action dated Jan. 28, 2020, in Patent Application No. 2018-242439; citing documents Foreign Cite Nos. 1 and 2; 6 pages (with unedited computer generated English translation).
Office Action dated Jan. 23, 2018 in Japanese Patent Application No. 2017-022349 (with English language translation).
International Search Report dated Nov. 5, 2013, in PCT/JP2013/077005, filed Oct. 3, 2013.
Office Action dated Jan. 6, 2015, in Japanese Patent Application No. 2014-531028 (with English language translation).
Office Action dated Apr. 7, 2015 in Japanese Patent Application No. 2014-531028 (with English language translation).
Office Action dated Oct. 5, 2021, in connection with corresponding Japanese Application No. 2020-193252 (4 pp., including machine-generated English translation).

* cited by examiner

FIG. 12

| | |
|---|---|
| Event 1 | |
| Action | Player A makes progress on quest |
| Time | 9:00 |
| Position | Latitude: 35.681382 Longitude: 139.766084 |
| Event 2 | |
| Action | Player A encounters boss |
| Time | 9:10 |
| Position | Latitude: 35.681382 Longitude: 139.766084 |
| Event 3 | |
| Action | Player A invites player B |
| Time | 9:20 |
| Position | Latitude: 35.681382 Longitude: 139.766084 |
| Event 4 | |
| Action | Player A attacks boss |
| Time | 9:30 |
| Position | Latitude: 35.681382 Longitude: 139.766084 |
| Event 5 | |
| Action | Boss attacks player A |
| Time | 9:40 |
| Position | Latitude: 35.681382 Longitude: 139.766084 |
| Event 6 | |
| Action | Players A and B defeat boss |
| Time | 9:50 |
| Position | Latitude: 35.681382 Longitude: 139.766084 |
| Event 7 | |
| Action | Provide item to players A and B |
| Time | 10:00 |
| Position | Latitude: 35.681382 Longitude: 139.766084 |

METHOD OF SYNCHRONIZING ONLINE GAME, AND SERVER DEVICE

CROSS-REFERENCE TO RELATED APPLICATIONS

The present application is a continuation application of U.S. patent application Ser. No. 16/601,457, filed Oct. 14, 2019, entitled "Method of synchronizing online game, and server device," which is a continuation of U.S. application Ser. No. 16/116,542 (now U.S. Pat. No. 10,456,688), filed Aug. 29, 2018, which is a continuation application of U.S. application Ser. No. 15/812,000 (now U.S. Pat. No. 10,080,968), filed Nov. 14, 2017, which is a continuation application of U.S. application Ser. No. 14/432,060 (now U.S. Pat. No. 9,849,389), filed Mar. 27, 2015, which is a National Stage Entry of PCT/JP2013/077005, filed Oct. 3, 2013, and claims priority to Japanese Application No. 2012-221566, filed Oct. 3, 2012; the entire contents of each of which are incorporated herein by reference.

FIELD

Embodiments of the present disclosure relates to a method of synchronizing an online game, and to a server device, for conducting an online game between a plurality of mobile terminals.

BACKGROUND

In recent years, as the Internet has spread, it has often become necessary for a user-operated, mobile terminal-side client device and a server device prepared by the provider of a game or the like to store the same information, such as game information, information on progress of the game, user information, and the like. In such server devices, game programs and the above information for game management are managed centrally using a database.

In this way, when storing the above identical information on a client device and a server device, the information stored on the client device and the server device end up differing if the mobile terminal of the client device that performs wireless communication goes offline, for example due to deterioration in the communication environment.

To address such a situation, conventionally a technique has been proposed so that, in a game that is executed by allocating a game space among a plurality of players, a client device can continue the game by independently using the game space allocated to the client device even while offline, with the content in the offline state being reflected upon subsequently returning online.

Such a conventional technique, however, cannot easily handle the need to execute the game in another game space, i.e. to use a game space allocated to another player or a shared game space, and complex synchronization processing by a server device for centralized management becomes necessary.

Exemplary embodiments of the present disclosure provide a method of synchronizing an online game, and a server device, that do not require centralized information management, that reduce the processing burden on each device during online communication, and that allow for continuation of processing in an offline environment.

SUMMARY

A method, according to an aspect of the present disclosure, of synchronizing an online game that allows for transmission and reception of information related to game processing between a first client terminal and a second client terminal via a server includes: receiving, from the first client terminal connected online, first information related to game processing on the first client terminal; determining whether the first information is information that determines a game status; and storing the first information on the server and transmitting the first information to the second client terminal when the first information is determined to be information that determines the game status.

According to exemplary embodiments of the present disclosure, centralized information management is unnecessary, and it is possible to reduce the processing burden on each device during online communication and to continue processing in an offline environment.

BRIEF DESCRIPTION OF THE FIGURES

Advantages Exemplary embodiments of the present disclosure will be further described below with reference to the accompanying drawings, wherein:

FIG. 12 illustrates the specific content of the event information in the embodiment;

DETAILED DESCRIPTION

Aspects With reference to the drawings, the following describes an online game system according to an embodiment of the present disclosure.

Figure 1:
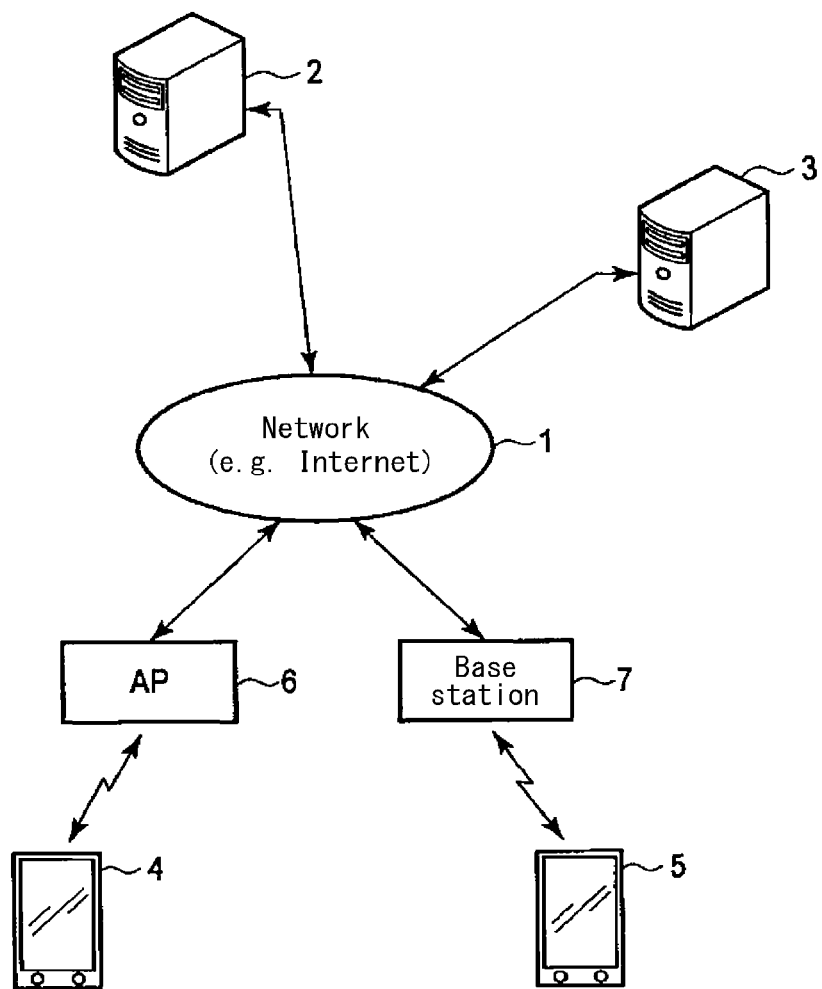
FIG. 1 illustrates an example of the environment in which an online game system according to an embodiment of the present disclosure is used.

FIG. 1 illustrates an example of the environment in which an online game system according to the embodiment is used. In FIG. 1, web server devices 2 and 3 are connected to a network 1, such as the Internet, and mobile terminals 4 and 5 that are client devices used by players in the present system are connected to the network 1 via an access point (AP) 6 or a base station 7.

The web server devices 2 and 3 are computers for implementing the online game system according to the present embodiment and are arranged in parallel with respect to the network 1 in order to provide service for the online game.

On the other hand, the mobile terminals 4 and 5 on the client side are each implemented with a smartphone, feature phone, or the like. The mobile terminals 4 and 5 operate on an OS such as Android®, iOS®, or the like. Furthermore, the mobile terminals 4 and 5 may each be a laptop computer, a mobile computer, a tablet computer, or the like. A game program for the online game is installed on the mobile terminals 4 and 5 in advance.

Figure 2:
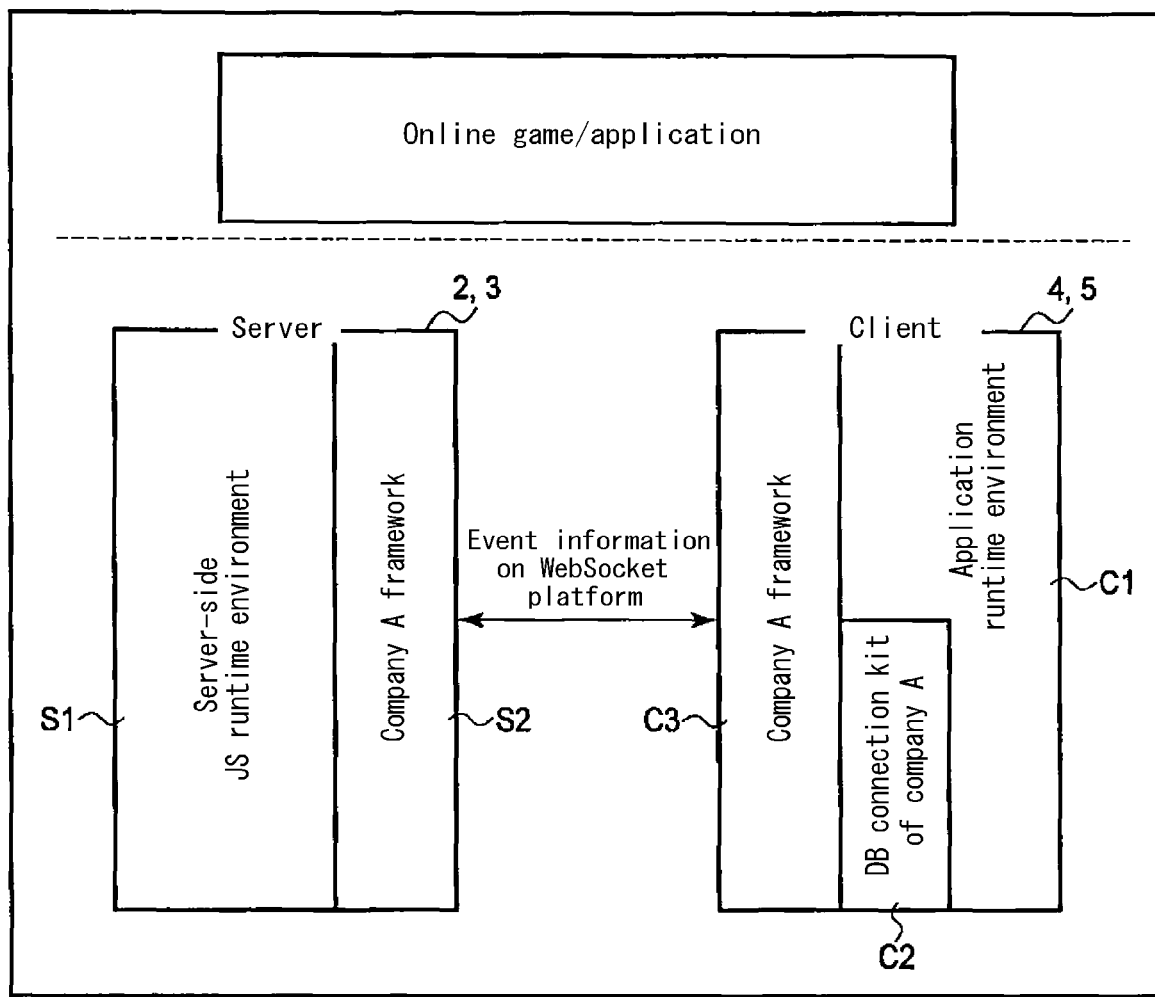
FIG. 2 conceptually illustrates the connection architecture between a server and a client according to the embodiment.

FIG. 2 conceptually illustrates the connection architecture between a server and a client according to the present embodiment. As illustrated in FIG. 2, in order to execute an online game program or an application program provided by company A, an application runtime environment C1, such as AIR®, for the game or application program is installed on the mobile terminals 4 and 5, and a database connection kit C2 of company A for connecting to the database of company A and performing accounting processing and the like is incorporated into the mobile terminals 4 and 5.

In addition, a (software) client-side framework C3 developed by company A is installed on the mobile terminals 4 and 5 for communication with the web server devices 2 and 3.

On the other hand, the web server devices 2 and 3 operated by company A are provided with a server-side JavaScript® (JS) runtime environment S1, such as Node.js®, in order to run the online game and the application, and with a (software) server-side framework of company A S2 corresponding to the framework C3, in order to transmit and receive data directly to and from the mobile terminals 4 and 5.

The framework C3 of the mobile terminals 4 and 5 and the framework S2 of the web server devices 2 and 3 transmit and receive event information for the game on the WebSocket platform, which is a standard implemented with HTML5®.

With WebSocket, once a connection is established between the server and a client, data can be transmitted and received by socket communication without paying attention to communication procedures, unless the connection is explicitly severed. In other words, with WebSocket, once the connection (handshake) between the server and the client is successful, it is possible to continue transmission only of data, without performing connection procedures when requesting data and when responding.

The server and all of the clients that have established a connection with WebSocket can share the same data, transmitting and receiving in real time.

Accordingly, using the above WebSocket standard compensates for the disadvantages of communication by Ajax (Asynchronous JavaScript®+XML) or Comet and allows for more effective bidirectional communication between the server and the client.

The frameworks C3 and S2 are programmed using a scripting language that does not depend on the OS, such as JavaScript®. Therefore, the same connection environment can be built regardless of whether the OS of the mobile terminals 4 and 5 is Android®, iOS®, or the like.

Figure 3:
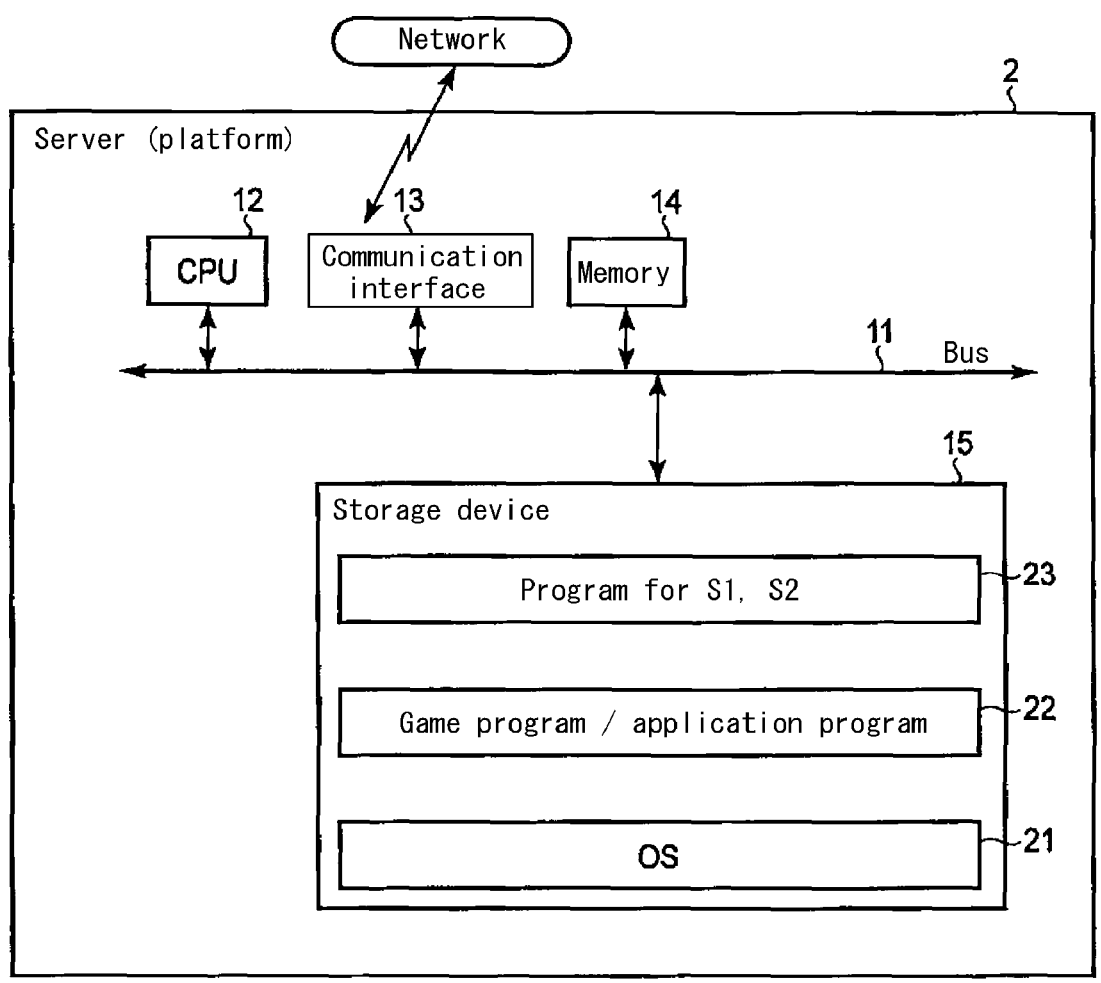
FIG. 3 illustrates an example of the configuration of the server according to the embodiment.

FIG. 3 illustrates an example of the configuration of the web server device 2 in the online game system according to an embodiment of the present disclosure. The web server device 3 has the same configuration as the web server device 2, and therefore a detailed description thereof is omitted. The configuration illustrated in FIG. 3 is only an example, and other configurations may be adopted.

As illustrated in FIG. 3, in the web server device 2, a CPU 12, communication interface 13, memory 14, and storage device 15 are connected over a bus 11.

In coordination with a game program/application program 22 (game program 22), according to an embodiment of the present disclosure, that is stored in the storage device 15, the CPU 12 executes game processing for the online game according to an embodiment of the present disclosure and performs overall control of the web server devices 2 and 3. By executing the game program 22, the CPU 12 provides an online game in which a plurality of players can participate simultaneously. The CPU 12 stores event information (details shown in FIG. 5), received from the mobile terminals 4 and 5 participating in the online game, in a queue memory described below and conducts the game based on the event information. The CPU 12 also synchronizes the online game by transmitting the event information stored in the queue memory to other mobile terminals participating in the online game.

Figure 7:
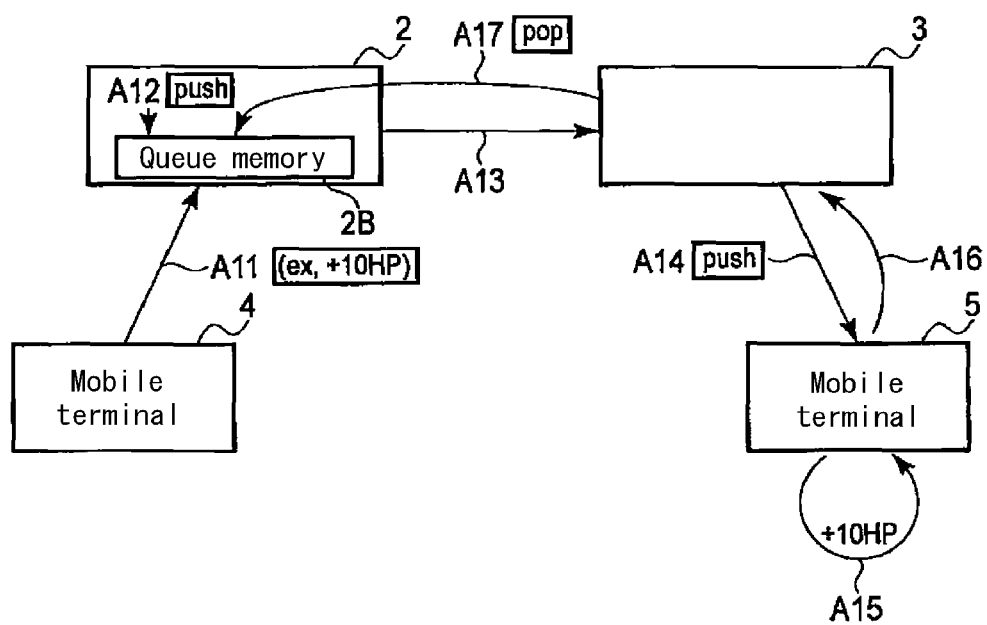
FIG. 7 illustrates a detailed processing path for event information in the online state according to the embodiment.
Figure 8:
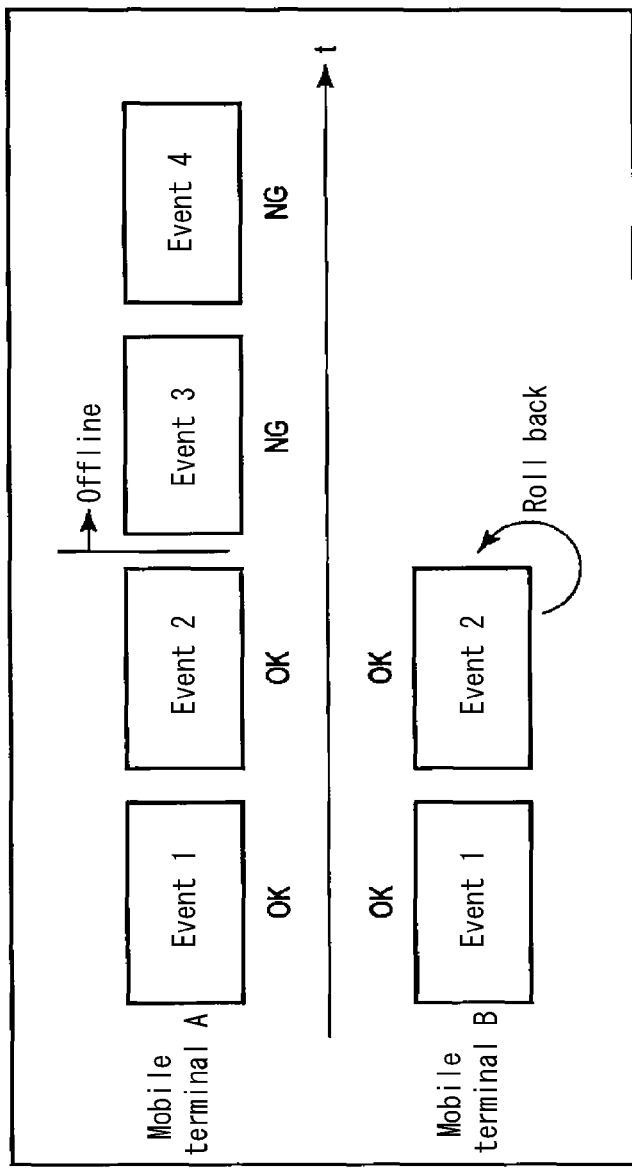
FIG. 8 conceptually illustrates game synchronization in the offline state according to the embodiment.
Figure 9:
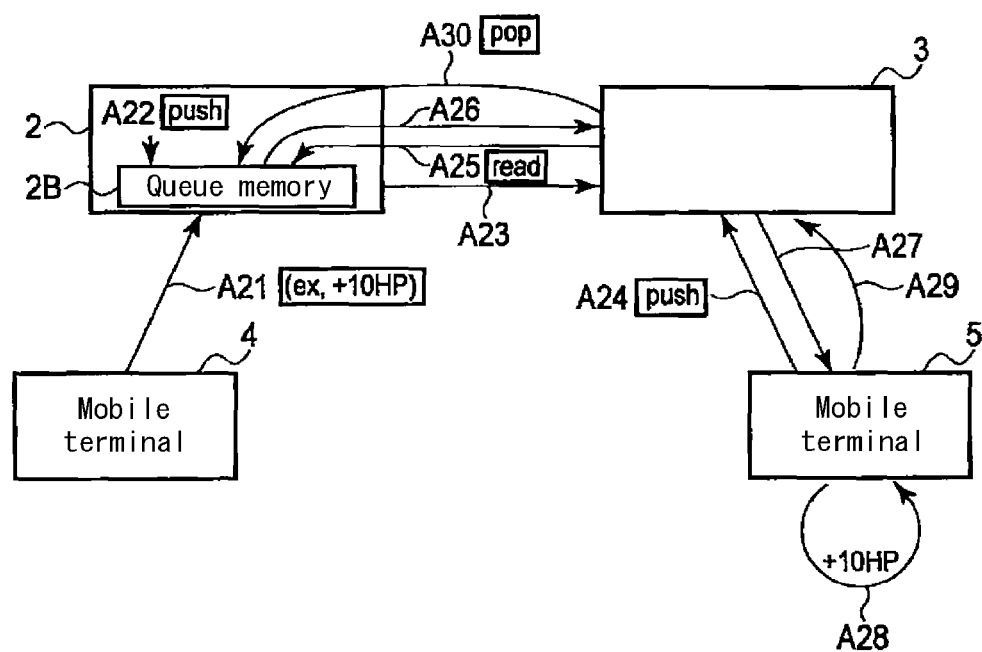
FIG. 9 illustrates a detailed processing path for event information after returning to the online state from the offline state according to the embodiment.

By executing the game program 22, the CPU 12 implements a function to verify the event information stored in the queue memory and the event information received from a mobile terminal that has returned from the offline state, in order to synchronize the online game executed on the mobile terminal that has returned and on another mobile terminal (details shown in FIGS. 7 to 9). By executing the game program 22, the CPU 12 also implements a function (details shown in FIGS. 10 to 16) to determine, based on the content of the event information, whether or not to transmit the event information to other mobile terminals in order to synchronize the online game.

The communication interface 13 controls communication, via the network 1, with external devices such as clients (mobile terminals 4 and 5). When game processing for the online game is executed by the CPU 12, the communication interface 13 uses WebSocket to transmit and receive data related to the game, including the event information.

The memory 14 is used as a work area or the like that is necessary when executing a variety of programs executed by the CPU 12 and a variety of programs including the game program 22. When the game program 22 is executed, the memory 14 is used as, for example, a queue memory for storing the event information received from the clients (mobile terminals 4 and 5) in the order of receipt.

The storage device 15 is for storing a variety of programs and data necessary for the online game according to the present embodiment and is, for example, a large capacity storage device such as a Hard Disk Drive (HDD), an optical disk drive, a Digital Versatile Disc (DVD), a Magnetic Optical disk (MO), or the like. An operating system (OS) 21, the game program 22, and a program 23 for S1 and S2 (JS runtime environment, framework) are stored in the storage device 15. The storage device 15 may also be used as the queue memory.

The OS 21 is a program for implementing the basic functions of the web server devices 2 and 3.

The game program 22 is a program for implementing server-side game processing in the online game according to an embodiment of the present disclosure. The game processing in the online game according to the present embodiment is mainly executed by the server-side game program 22, and display processing is executed on the client side. A portion or all of the game processing executed on the server side may, however, be executed on the client side.

The program 23 for Si and S2 is a program for implementing the JS runtime environment Si and the framework S2 illustrated in FIG. 2.

Figure 4:
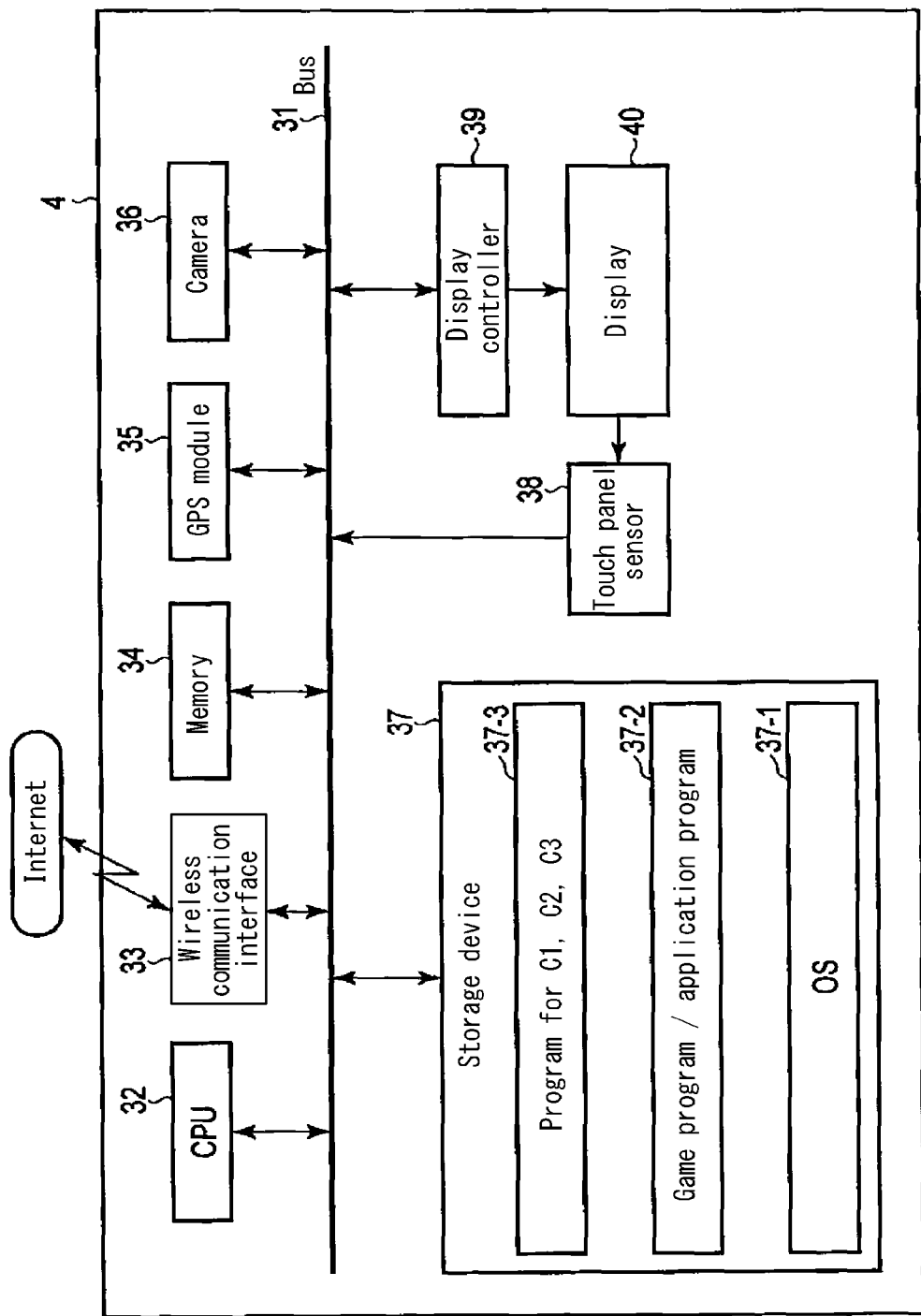
FIG. 4 illustrates an example of the configuration of the client according to the embodiment.

FIG. 4 illustrates an example of the configuration of the mobile terminal 4 according to an embodiment of the present disclosure. The mobile terminal 5 has the same configuration as the mobile terminal 4, and therefore a detailed description thereof is omitted. The mobile terminals 4 and 5 may have a configuration other than the configuration illustrated in FIG. 4.

As illustrated in FIG. 4, a CPU 32, wireless communication interface 33, memory 34, GPS module 35, camera 36, storage device 37, touch panel sensor 38, and display controller 39 are connected to a bus 31.

In coordination with a game program/application program 37-2 (game program 37-2) stored in the storage device 37, the CPU 32 executes game processing for the online game according to an embodiment of the present disclosure and performs overall control of the mobile terminal 4. The CPU 32 mainly executes display processing to display game screens in accordance with the results of game processing executed by the web server devices 2 and 3.

The wireless communication interface 33 controls communication, via the network 1, with external devices such as a server. The wireless communication interface 33 has a wireless communication function such as wireless LAN, Bluetooth®, WiFi, or the like.

The memory 34 is used as a work area or the like that is necessary when executing the application program 37-3 related to client-side game processing.

The GPS module 35 uses a Global Positioning System (GPS) to generate position information (latitude, longitude), time information, and the like.

The camera 36 includes a function to capture still images or video.

The storage device 37 is for storing a variety of programs and data necessary for the online game according to the present embodiment and is implemented by, for example, flash memory or the like. An OS 37-1, the game program 37-2, and the program 37-3 for C1, C2, and C3 are stored in the storage device 37.

The OS 37-1 is a program for implementing the basic functions of the mobile terminal 4.

The game program 37-2 is a program for implementing client-side game processing in the online game according to an embodiment of the present disclosure. The game processing in the online game of the present embodiment is mainly executed on the server side (web server devices 2 and 3). Therefore, the client-side game processing is mainly processing to display game screens in accordance with the results of game processing executed on the server side, processing to transmit event information in accordance with input operations by the user in response to the game screens, and the like. A portion or all of the game processing executed on the client side may, however, be executed on the server side.

The program 37-3 for C1, C2, and C3 is a program for implementing the application runtime environment C1, the database connection kit C2 of company A, and the framework C3 illustrated in FIG. 2.

The touch panel sensor 38 is a sensor for detecting a touch operation on the touch panel mounted on the display surface of a display 40.

The display controller 39 controls display by the display 40.

The display 40 is configured using, for example, a Liquid Crystal Display (LCD) or the like and displays game screens and the like via control by the display controller 39.

Next, operations in the online game system according to an embodiment of the present disclosure are described.

Figure 5:
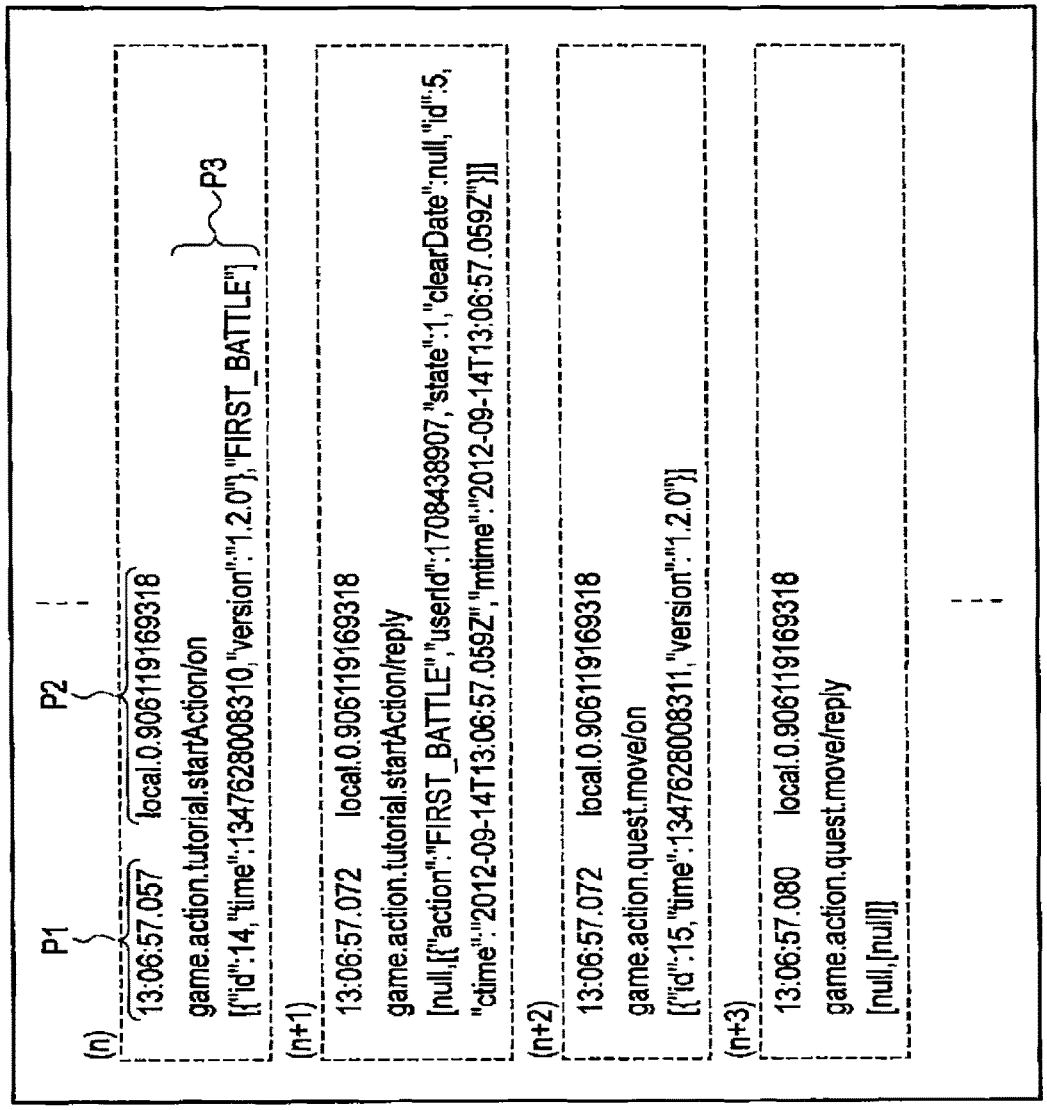
FIG. 5 illustrates an example of the content of event information transmitted and received between the server and client according to the embodiment.

FIG. 5 illustrates an example of the content of event information that, during execution of the online game, is transmitted and received between the web server devices 2 and 3 and the mobile terminals 4 and 5.

As illustrated in FIG. 5, one set of event information is information indicating the content of an event that occurs on the mobile terminals 4 and 5 due to execution of the online game and includes time information P1, position information P2, and action information P3. The time information P1 indicates a time at which the user performed an input operation during the game. The position information P2 indicates the position at the time at which the user performed an input operation during the game. For example, the position information P2 is a numerical conversion of the position information (latitude, longitude) generated by the GPS module 35 of the mobile terminals 4 and 5. The action information P3 indicates the content of an action related to an event occurring in response to a user input operation or the like, based on a game program installed in advance on the mobile terminals 4 and 5.

Figure 6:
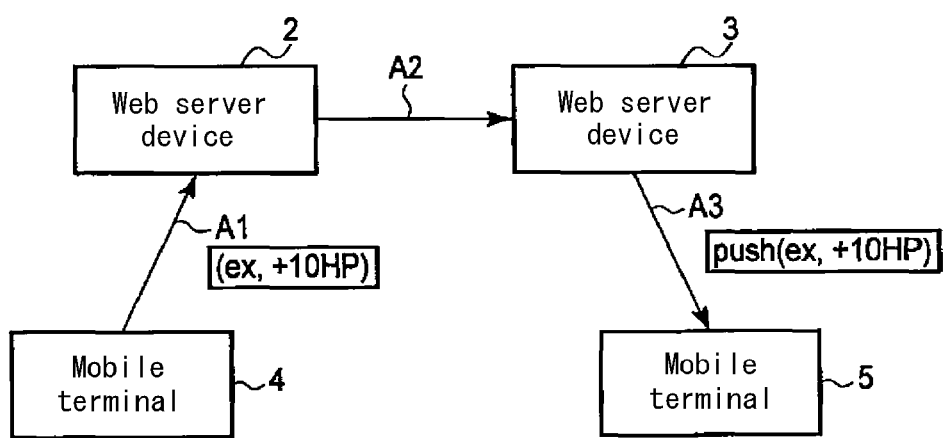
FIG. 6 illustrates a superficial processing path for event information in the online state according to the embodiment.

FIG. 6 illustrates an example of a processing path for event information in order to synchronize the online game in the present embodiment (a specific processing path is described below). In FIG. 6, the mobile terminal 4 is connected to the web server device 2, the mobile terminal 5 is connected to the web server device 3, and the web server device 2 and web server device 3 are connected. In other words, the web server devices 2 and 3 and the mobile terminals 4 and 5 are in a state allowing for transmission and reception of data (event information) by socket communication.

In the online game according to the present embodiment, each player participating in the game can move a character corresponding to the player in the game space by operating the mobile terminal that the player uses. A plurality of enemy characters is deployed within the game space. The player character moves within the game space (makes progress on a quest) and can attack an enemy character upon encountering the enemy character. If the player character attacks and manages to defeat the enemy character, the player character can, for example, acquire an item usable in the game. A plurality of players may also attack an enemy character together.

In FIG. 6, when mobile terminal 4 and mobile terminal 5 are participating in the online game, event information indicating the content of an event occurring due to game processing on the mobile terminal 4 is transmitted to the mobile terminal 5 in order to synchronize game processing executed on the mobile terminals 4 and 5.

For example, when an event occurs such that the hit points (HP) indicating the stamina of the game character controlled by user operation are modified by "+10", the mobile terminal 4 executes processing for this event and transmits event information A1 indicating the event to the web server device 2. The web server device 2 transmits event information A2 received from the mobile terminal 4 to the web server device 3. By a push operation, the web server device 3 transmits the event information A3 relayed by the web server device 2 to the mobile terminal 5 that is participating in the same online game as the mobile terminal 4. Based on the event information indicating the content of the event that occurred on the mobile terminal 4, the mobile terminal 5 modifies the stamina of the character controlled through operation by the user of the mobile terminal 4 in the game by "+10 HP".

Next, a specific example of a processing path for event information in order to synchronize the online game in the present embodiment is described. FIG. 7 illustrates an example of a specific processing path for the event information illustrated in FIG. 4.

When an event occurs such that the hit points (HP) indicating the stamina of the game character controlled by user operation are modified by "+10", the mobile terminal 4 executes processing for this event and transmits event information indicating the content of the event to the web server device 2 (A11). The event information includes action information to modify the hit points (HP) by "+10", time information indicating the time that the event occurred, and position information indicating the position of the mobile terminal 4 when the event occurred.

By a push operation (A12), the web server device 2 stores the event information from the mobile terminal 4 in a queue memory 2B and then transmits the same event information to the web server device 3 (A13).

Upon receiving the event information from the web server device 2, the web server device 3 transmits the same event information by a push operation to the mobile terminal 5 of the other game player participating in the same online game (A14). Based on the content of the event information received from the web server device 3, the mobile terminal 5 executes game processing to modify the stamina of the character, in the online game, for the mobile terminal 4 by "+10 HP" (A15). In order to respond that the event information received from the web server device 3 has been reflected in the game processing, the mobile terminal 5 sends the event information back to the web server device 3 (A16).

Upon receiving the event information back from the mobile terminal 5, the web server device 3 determines that the event information has been reflected in the game processing on the mobile terminal 5. The web server device 3 then returns the event information by a pop operation on the queue memory 2B of the web server device 2 (A17).

In this way, when an event occurs on the mobile terminal 4, the online game system in the present embodiment can synchronize the online game being executed on the mobile terminals 4 and 5 by transmitting the event information indicating the content of the event from the mobile terminal 4 to the mobile terminal 5, without centralized information management by the server.

The following describes a method of synchronizing the online game when a mobile terminal participating in the online game is temporarily in an offline state.

FIG. 8 conceptually illustrates synchronization of the online game when an offline state occurs. The following illustrates an example of mobile terminal A going offline starting at event 3 while mobile terminal A and mobile terminal B are executing the online game. In FIG. 8, mobile terminal A for example corresponds to the mobile terminal 4 in FIG. 7, and mobile terminal B for example corresponds to the mobile terminal 5 in FIG. 7.

In this case, even when going offline, mobile terminal A continues game processing via the game program installed in advance. Mobile terminal A cannot, however, transmit and receive event information to and from mobile terminal B regarding events from event 3 onward (and the processing result is determined to be an error).

Since there is no response from mobile terminal A after event 2, mobile terminal B enters a rollback state after executing processing for event 2. In other words, mobile terminal B maintains a state of no progress in the game.

Here, accounting processing in the game is an example of what is rolled back. The result of a battle by a character, progress by the character in the game space, and the like are examples of what is not rolled back. With regard to event information considered important for game progress, a rollback may be performed after determining event information by providing a specific threshold.

Accordingly, after mobile terminal A returns to the online state, events up to event 2 are valid for both mobile terminals A and B based on the event information stored on the mobile terminals, and a correct synchronous state can be maintained between mobile terminal A and mobile terminal B by the web server device intermediating to verify whether events from event 3 onwards on mobile terminal A lead to a discrepancy in progress of the game and causing mobile terminals A and B to reflect the results of verification.

In FIG. 8, when it is determined that allowing event 3 to be finalized would prevent synchronization with mobile terminal B, event 3 on mobile terminal A is invalidated, as illustrated in FIG. 8. On the other hand, if it is determined that finalizing event 3 would allow for synchronization without causing any discrepancy with mobile terminal B, permission is granted to finalize event 3.

The criteria for determination when the web server device performs the above verification are the event information that is transmitted from the terminal by batch processing after returning online and the event information accumulated in the queue memory 2B in the web server. By referring to the time information P1 and position information P2 in these two groups of event information to make determinations, using a threshold specified in advance as necessary, it is possible accurately to verify valid event information in the online state existing before the offline state occurred.

As described above, when event information executed in the offline state is determined not to disrupt mutual synchronization after returning online, the event information is treated as valid and execution is permitted.

FIG. 9 illustrates a processing path for event information after the mobile terminal 4 returns to the online state from the offline state. Here, an example is illustrated in which an event that occurred while the mobile terminal 4 was offline has been determined to be valid.

While executing game processing in the offline state, the mobile terminal 4 stores event information for events occurring by game processing. Upon returning to the online state from the offline state, the mobile terminal 4 transmits stored event information to the web server device 2.

For example, assume that event information (A21) such that the hit points (HP) indicating the stamina of the game character controlled by user operation are modified by "+10" is transmitted from the mobile terminal 4 by batch processing to the web server device 2. When the mobile terminal 4 returns to an online state, the mobile terminals 4 and 5 and the web server devices 2 and 3 enter a state allowing for transmission and reception of data, including event information, via WebSocket (socket communication).

The web server device 2 stores the event information (A21) from the mobile terminal 4 in the queue memory 2B by a push operation (A22) and then transmits the same event information to the web server device 3 (A23).

At this point, the mobile terminal 5 that has entered an online state with the mobile terminal 4 transmits the same event information by a push operation to the web server device 3 (A24). Upon receiving this event information, the web server device 3 accesses the queue memory 2B of the web server device 2 (A25), and after reading the same event information (A26) stored in the queue memory 2B, transmits the same event information to the mobile terminal 5 (A27).

Based on the content of the event information received from the web server device 3, the mobile terminal 5 executes game processing to modify the stamina of the character for the mobile terminal 4 within the online game by "+10 HP" (A28). In order to respond that the event information received from the web server device 3 has been reflected in the game processing, the mobile terminal 5 sends the event information back to the web server device 3 (A29).

Once the mobile terminal 5 returns the event information, the web server device 3 determines that the event information has been reflected in the game processing on the mobile terminal 5. The web server device 3 then returns the event information by a pop operation on the queue memory 2B of the web server device 2 (A30). This concludes the processing sequence after returning online when event information has been generated on the mobile terminal 4 while offline.

In this way, with regard to event information occurring in the offline state as well, it is possible to provide the user with a game environment having less of a sense of incongruity when an offline state occurs by defining, in advance, event information permissible with respect to game progress in the offline state, such as character movement in the game space, i.e. content that does not cause any discrepancy in game progress for both of the mobile terminals 4 and 5.

Examples of specific event information include finishing a quest in the game, battling another character, the acquisition of an item and consequent accounting processing, and the like.

Next, another example of processing for synchronizing the online game in the present embodiment is described.

Figure 10:
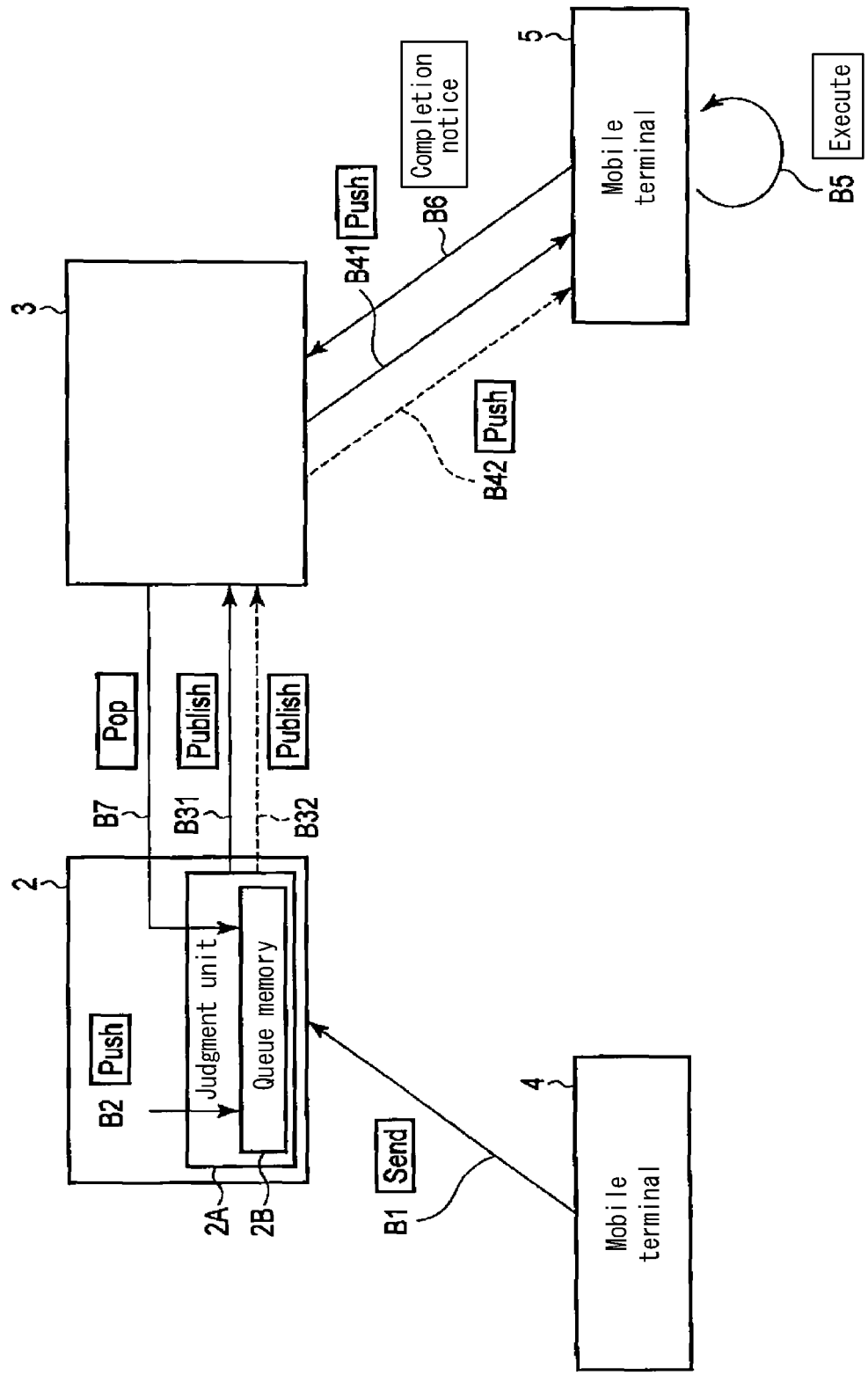
FIG. 10 illustrates a specific example of the processing path for event information in order to synchronize the online game in the embodiment.
Figure 11A:
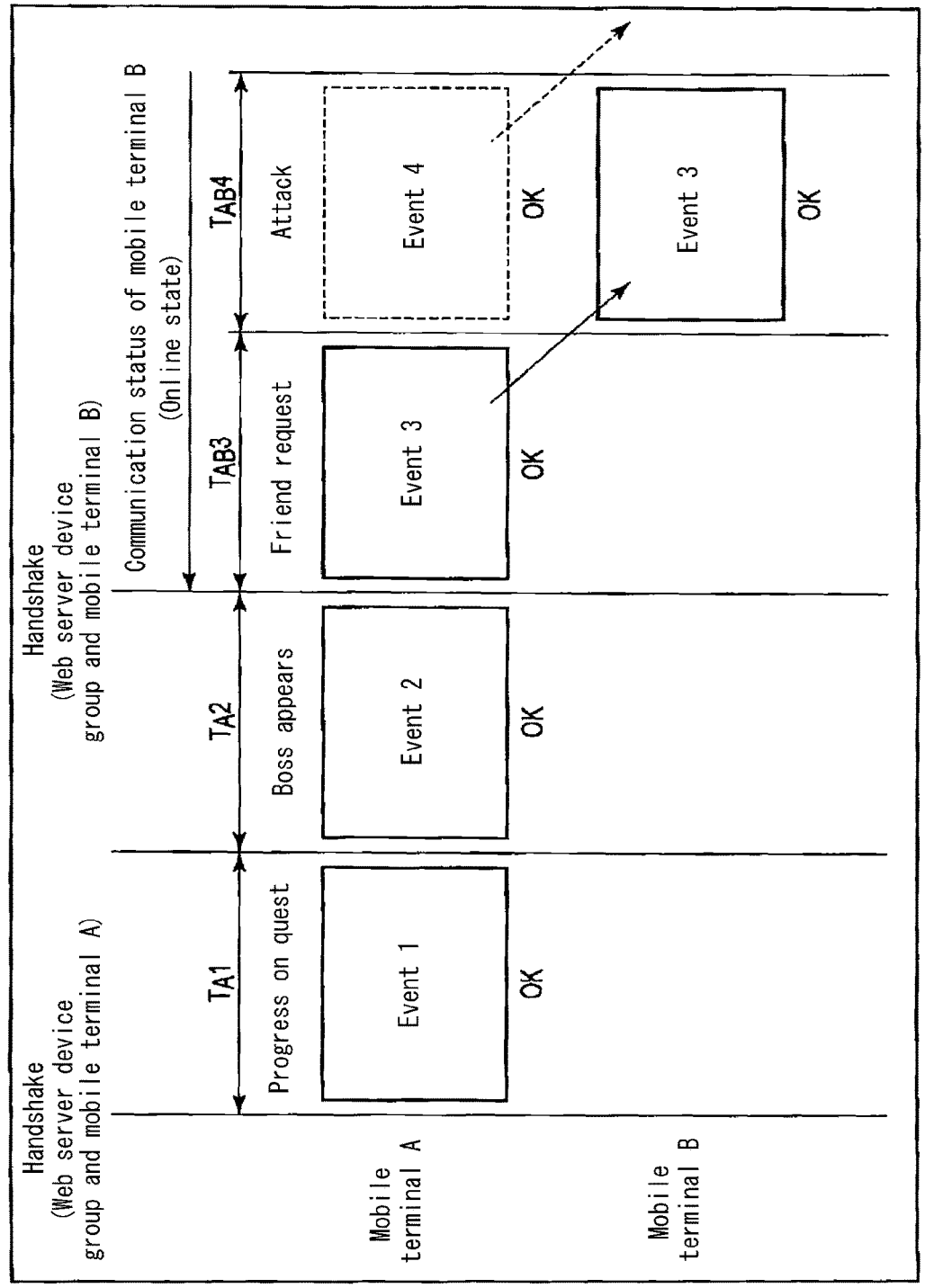
FIG. 11A illustrates a specific example of event information transmitted from mobile terminal A to mobile terminal B as a result of game progress in the embodiment.
Figure 11B:
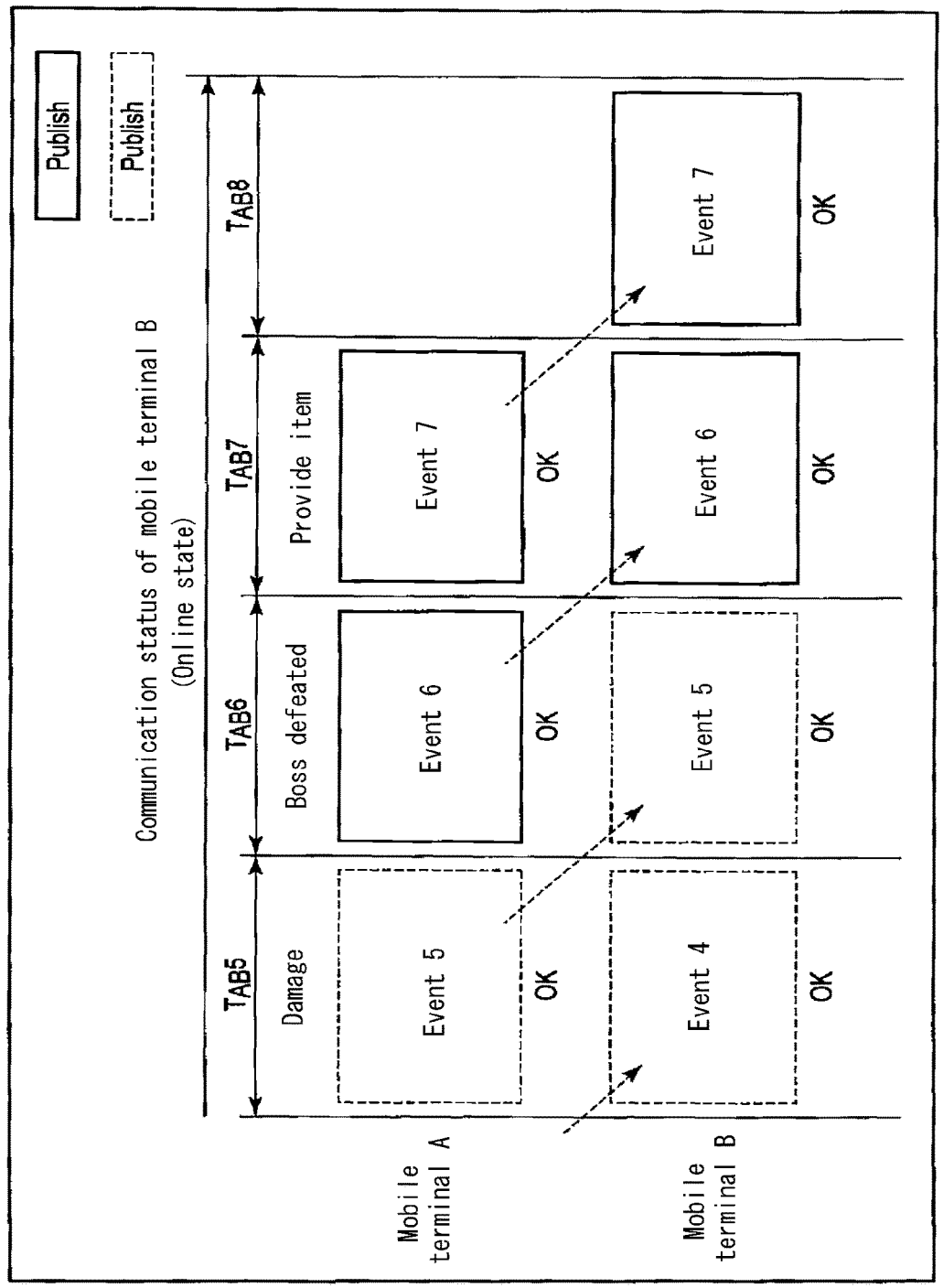
FIG. 11B illustrates a specific example of event information transmitted from mobile terminal A to mobile terminal B as a result of game progress in the embodiment.

FIG. 10 illustrates a specific example of the processing path for event information in order to synchronize the online game in the present embodiment. FIGS. 11A and 11B illustrate a specific example of event information transmitted from mobile terminal A to mobile terminal B as a result of game progress, and FIG. 12 illustrates the specific content of the event information in FIGS. 11A and 11B. In FIGS. 11A and 11B, time is shown as flowing from left to right.

In FIGS. 11A and 11B, mobile terminal A for example corresponds to the mobile terminal 4 in FIG. 10, and mobile terminal B for example corresponds to the mobile terminal 5 in FIG. 10. In other words, FIGS. 11A and 11B illustrate an example of transmitting event information for an event occurring on the mobile terminal 4 from the mobile terminal 4 to the mobile terminal 5. Note that when an event occurs on the mobile terminal 5, event information is transmitted from the mobile terminal 5 to the mobile terminal 4 in the same way as when an event occurs on the mobile terminal 4. Furthermore, in FIG. 10, only two mobile terminals 4 and 5 are illustrated, yet when a plurality (three or more) players are participating in the online game, event information is transmitted and received between the mobile terminals used by the players. In other words, the event information for an event occurring on one mobile terminal needs to be transmitted to a plurality of mobile terminals. Accordingly, as the number of players participating in the online game increases, the traffic for transmitting and receiving event information greatly increases.

In the online game system of the present embodiment, upon receiving event information from a mobile terminal in order to synchronize the online game, the web server device determines whether the event information is related to game processing (game status) being executed on another mobile terminal. Upon determining that the event information is related to game processing (game status) being executed on another mobile terminal, the web server device stores the event information in the queue memory and transmits the event information to the other mobile terminal in order to synchronize the online game.

Assume that the web server devices 2 and 3 illustrated in FIG. 10 are in a state allowing for data communication via WebSocket. In order to participate in the online game, the mobile terminal 4 performs a handshake and connects to the web server device 2. As a result, the mobile terminal 4 enters a state allowing for data communication via WebSocket with the web server device group that includes the web server devices 2 and 3 (and includes any mobile terminals connected to each web server device).

In the game space of the online game, a player character corresponding to the mobile terminal 4 is generated. In accordance with player operation on the mobile terminal 4, the player character can perform a variety of actions in the game space. For example, assume that an operation is performed on the mobile terminal 4 to move the player character in the game space, i.e. to make progress on a quest (TA 1 in FIG. 11A). The CPU 32 of the mobile terminal 4 executes game processing in accordance with the input operation and generates event information for this event 1. As illustrated in FIG. 12, the event information for event 1 includes "player A makes progress on quest" as the action information indicating the content of the event, "9:00" as the time information, and "latitude 35.681382, longitude 139.766084" as the position information. The time information indicates the time managed by the mobile terminal 4 when the input operation was performed. The position information is generated based on the latitude and longitude acquired by the GPS module 35. The time information need not be the time managed by the mobile terminal 4 and may be the time managed by the web server device 2. In this case, the event information transmitted from the mobile terminal 4 to the web server device 2 does not include time information, but rather the time information is added on by the web server device 2.

By a Send operation (B1: Send), the mobile terminal 4 transmits the event information to the web server device 2 via WebSocket. A determination unit 2A of the web server device 2 determines whether the event information is legitimate based on the position information included in the event information. In other words, the determination unit 2A determines the travel distance of the mobile terminal 4 by comparing the position information in event information received earlier with the position information in event information received later. The determination unit 2A determines whether the travel distance of the mobile terminal 4, which was determined based on the position information, is a distance that can physically be traveled. For example, based on the time information in event information received earlier and the time information in event information received later, the determination unit 2A calculates the length of time from the time when the earlier event information was received to the time when the later event information was received. For example, a reference value is set for determining the distance that can be traveled with respect to time, and when the travel distance is greater than the set value, the determination unit 2A determines that the event information received from the mobile terminal 4 is not legitimate. For example, if the user of another mobile terminal in a location distant from the mobile terminal 4 steals the identity of the player using the mobile terminal 4 and participates in the online game, the determination unit 2A can determine that the event information from the other mobile terminal is not legitimate. In this case, the determination unit 2A invalidates the event information received from the mobile terminal 4 and suspends game processing. In the following explanation, it is assumed that the web server devices 2 and 3 receive legitimate event information from the mobile terminals 4 and 5.

On the other hand, when the event information is determined to be legitimate, the web server device 2 executes game processing corresponding to the event information received from the mobile terminal 4. Here, when no other player is participating in the online game in which the mobile terminal 4 is participating, the web server device 2 need not transmit the event information received from the mobile terminal 4 to any other mobile terminal (or web server device).

Similarly, upon occurrence of an event in which a player character encounters an enemy character (boss character) in the game space (TA 2 in FIG. 11A), the mobile terminal 4 generates event information for this event 2 and transmits the event information to the web server device 2 (B1: Send). Details on the event information for this event 2 are shown in FIG. 12.

In order to participate in the online game, the mobile terminal 5 also performs a handshake and connects to the web server device 3. As a result, the mobile terminal 5 enters a state allowing for data communication via WebSocket with the web server device group that includes the web server devices 2 and 3 (and includes any mobile terminals connected to each web server device).

Assume that in order to attack the enemy character (boss character) together with another player, the player of the mobile terminal 4 issues a friend request (TAB 3 in FIG. 11A). The mobile terminal 4 generates event information for this event 3 and transmits the event information to the web server device 2 (B1: Send). As illustrated in FIG. 12, the event information for the event 3 includes data indicating that "player A invites player B" as the action information indicating the content of the event for the friend request.

Upon receiving the event information for event 3 from the mobile terminal 4, the determination unit 2A of the web server device 2 determines whether to transmit the event information to the mobile terminal 5 based on the content of the event information. For example, the determination unit 2A determines whether to transmit the event information to the mobile terminal 5 based on whether the event information is for an event related to the game status of the mobile terminal 5 that is participating in the same online game as the mobile terminal 4. A determination table for determining whether an event is related to the game status of another mobile terminal is, for example, provided in the determination unit 2A. In the determination table, conditions for determining whether an event is related to the game status are defined. When the conditions defined in the determination table are applicable to the action information in the event information received from the mobile terminal 4, the determination unit 2A can determine that the event information is for an event related to the game status.

Since the action information included in the event information is "player A invites player B", the determination unit 2A determines that the event is related to the game status of the mobile terminal 5 used by player B. In other words, the determination unit 2A determines that the event information for event 3 is to be transmitted to the mobile terminal 5. In this case, the determination unit 2A stores the event information received from the mobile terminal 4 in the queue memory 2B.

By a push operation (B2: Push), the determination unit 2A transmits the event information stored in the queue memory 2B via WebSocket to the web server device 3 connected to the mobile terminal 5 (B31: Publish).

Upon receiving the event information from the web server device 2, the web server device 3 transmits the event information by a push operation via WebSocket to the mobile terminal 5 of the other game player participating in the same online game (B41: Push). The mobile terminal 5 executes game processing based on the content of the event information received from the web server device 3 to reflect the event that occurred on the mobile terminal 4 (B5: Execute). In order to provide notification that the event information received from the web server device 3 has been reflected in the game processing, the mobile terminal 5 sends a completion notice to the web server device 3 (B6: Completion notice).

In response to the completion notice from the mobile terminal 5, the web server device 3 notifies the web server device 2 via a pop operation (B7: Pop). In response to the notification via the pop operation, the determination unit 2A of the web server device 2 deletes the event information that was stored in the queue memory 2B and transmitted to the mobile terminal 5.

By receiving the event information for the friend request from the mobile terminal 4, the mobile terminal 5 notifies player B of the friend request from player A. By responding to the friend request, player B can participate in the attack on the enemy character (boss character) along with player A. When an input operation by player B indicates to attack the enemy character (boss character), the mobile terminal 5 generates an attack event like the mobile terminal 4 and transmits the event information for the attack to the web server device 3. In other words, the position information of the event occurring on the mobile terminal 5 is transmitted to the mobile terminal 4 via WebSocket.

The mobile terminal 4 generates an attack event in accordance with an input operation by player A (TAB 4 in FIG. 11A), and in the same way as described above, transmits the event information to the web server device 2 (B1: Send). Upon receiving the event information event for event 4 from the mobile terminal 4, the determination unit 2A of the web server device 2 determines whether the event information is for an event related to the game status of the mobile terminal 5.

Here, based on the conditions defined in the determination table, the determination unit 2A determines that the event to attack the enemy character is not an event related to the game status of the mobile terminal 5. In this case, the determination unit 2A transmits the event information received from the mobile terminal 4 to the web server device 3 without storing the event information in the queue memory 2B.

Upon receiving the event information from the web server device 2, the web server device 3 transmits the event information by a push operation via WebSocket to the mobile terminal 5 of the other game player participating in the same online game (B42: Push). The mobile terminal 5 executes game processing based on the content of the event information received from the web server device 3 to reflect the event that occurred on the mobile terminal 4 (B5: Execute).

In this way, by transmitting the event information received from the mobile terminal 4 to the web server device 3, game processing for the online game executed on the mobile terminals 4 and 5 can reliably be synchronized.

By not storing, in the queue memory 2B, the event information that was determined not to be transmitted to the mobile terminal 5, use of the memory capacity of the queue memory 2B can also be reduced.

Furthermore, when it is determined that the event information received from the mobile terminal 4 is for an event related to the game status of the mobile terminal 5, storing this event information in the queue memory 2B makes it possible reliably to synchronize the game processing even when the mobile terminal 5 is in an offline state. Operations when the mobile terminal 5 is in an offline state are described below (see FIGS. 13 and 14).

Similarly, the event information for event 5 occurring on mobile terminal 4 includes the data "boss attacks player A" as the action information and is determined by the determination unit 2A of the web server device 2 not to be an event related to the game status of the mobile terminal 5 (TAB 5 in FIG. 11B). The event information for event 5 is like the event information for event 4, in that the event information received from the mobile terminal 4 is transmitted to the web server device 3 without being stored in the queue memory 2B.

Next, the event information for event 6 occurring on the mobile terminal 4 includes the data "players A and B defeat the boss" as the action information. Players A and B operating the mobile terminals 4 and 5 are attacking the enemy character (boss character) by respective input operations. As a result, the boss character can be defeated by an attack produced by the input operation of one of the players. In this case, the fact that "the boss was defeated" relates to the game status of both players A and B.

Accordingly, the determination unit 2A of the web server device 2 determines that the event information for event 6 is for an event relating to the game status of the mobile terminal 5 (TAB 6 in FIG. 11B). The event information for event 6 is stored in the queue memory 2B and is transmitted to the mobile terminal 5 via the web server device 3.

Similarly, the event information for event 7 occurring on mobile terminal 4 includes the data "provide item to players A and B" as the action information and is determined by the determination unit 2A of the web server device 2 to be an event related to the game status of the mobile terminal 5 (TAB 7 in FIG. 11B). Like the event information for event 6, the event information for event 7 is stored in the queue memory 2B and is transmitted to the mobile terminal 5.

In this way, the web server device 2 can determine whether to transmit the event information received from the mobile terminal 4 to the mobile terminal 5 by determining whether the content of the event information relates to the game status of the mobile terminal 5. The web server device 2 stores event information that relates to the game status of the mobile terminal 5 in the queue memory 2B and transmits the event information to the mobile terminal 5, whereas the web server device 2 transmits event information that does not relate to the game status of the mobile terminal 5 to the mobile terminal 5 without storing the event information in the queue memory 2B. In other words, transmitting the event information for an event occurring on the mobile terminal 4 to the mobile terminal 5 allows for synchronization of the online game.

In the explanation above, the event information received from the mobile terminal 4 is transmitted to the mobile terminal 5 regardless of whether the event information relates to the game status of the mobile terminal 5. In the present embodiment, a configuration may be adopted so that when the determination unit 2A of the web server device 2 determines that the event information from the mobile terminal 4 does not relate to the game status of the mobile terminal 5, the event information is not transmitted to the mobile terminal 5.

In this configuration, the transmission of event information from the web server device 2 to the web server device 3 (B32: Publish) and the transmission of event information from the web server device 3 to the mobile terminal 5 (B42: Push), indicated by dashed lines in FIG. 10, are omitted. In this way, traffic for transmitting the event information can be reduced.

The above explanation has focused on transmitting event information from the mobile terminal 4 to the mobile terminal 5, yet event information is transmitted from the mobile terminal 5 to the mobile terminal 4 in the same way. Accordingly, the amount of traffic for transmitting event information from the mobile terminal 5 to the mobile terminal 4 can also be reduced. Furthermore, when more players are participating in the same online game, a large reduction in the amount of traffic can be expected.

The following describes a method of synchronizing the online game when the mobile terminal 5 participating in the online game temporarily goes offline.

Figure 13:
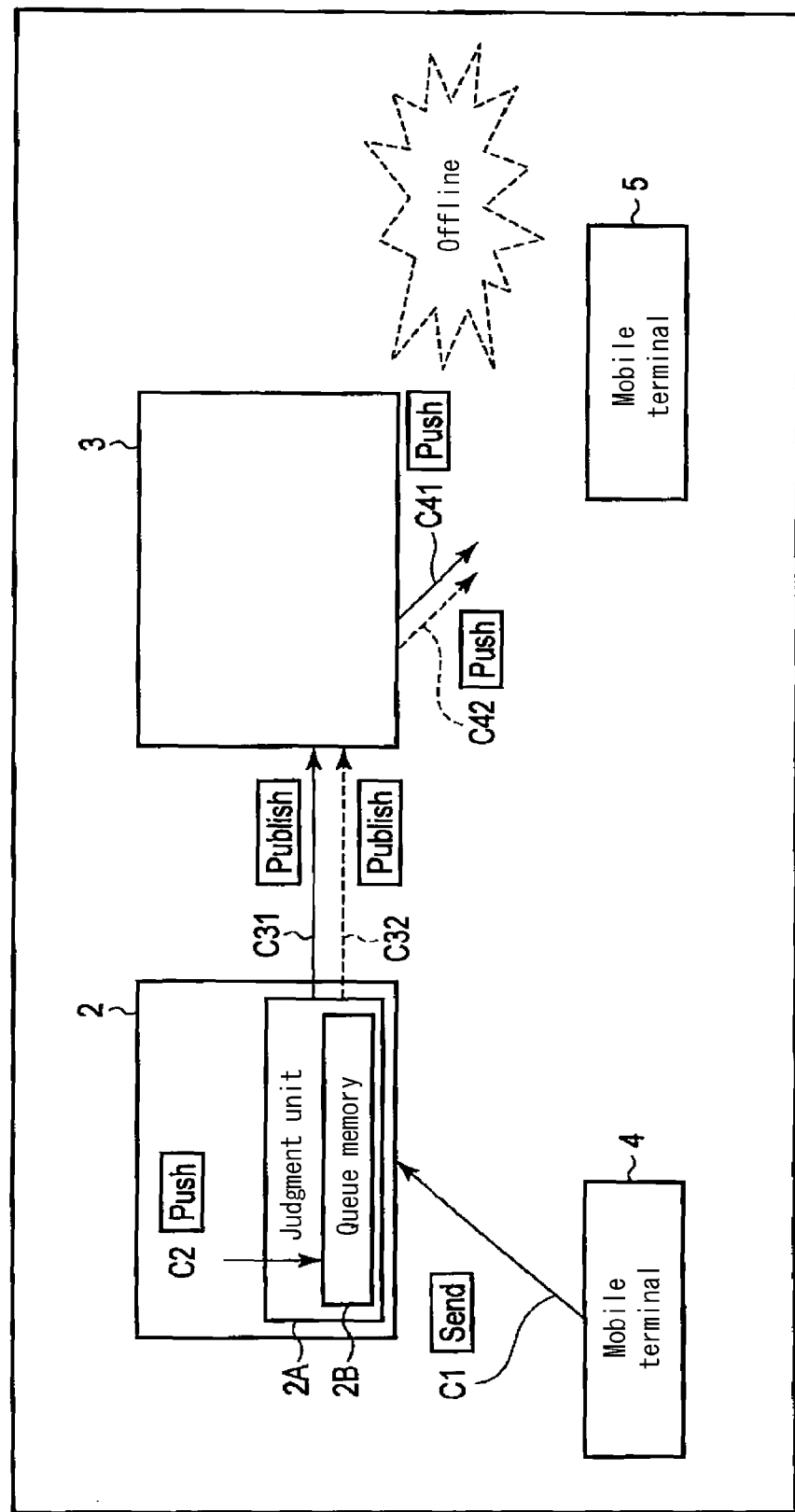
FIG. 13 illustrates an example of the processing path for event information in the situation that a mobile terminal is in a temporary offline state in the embodiment.
Figure 14:
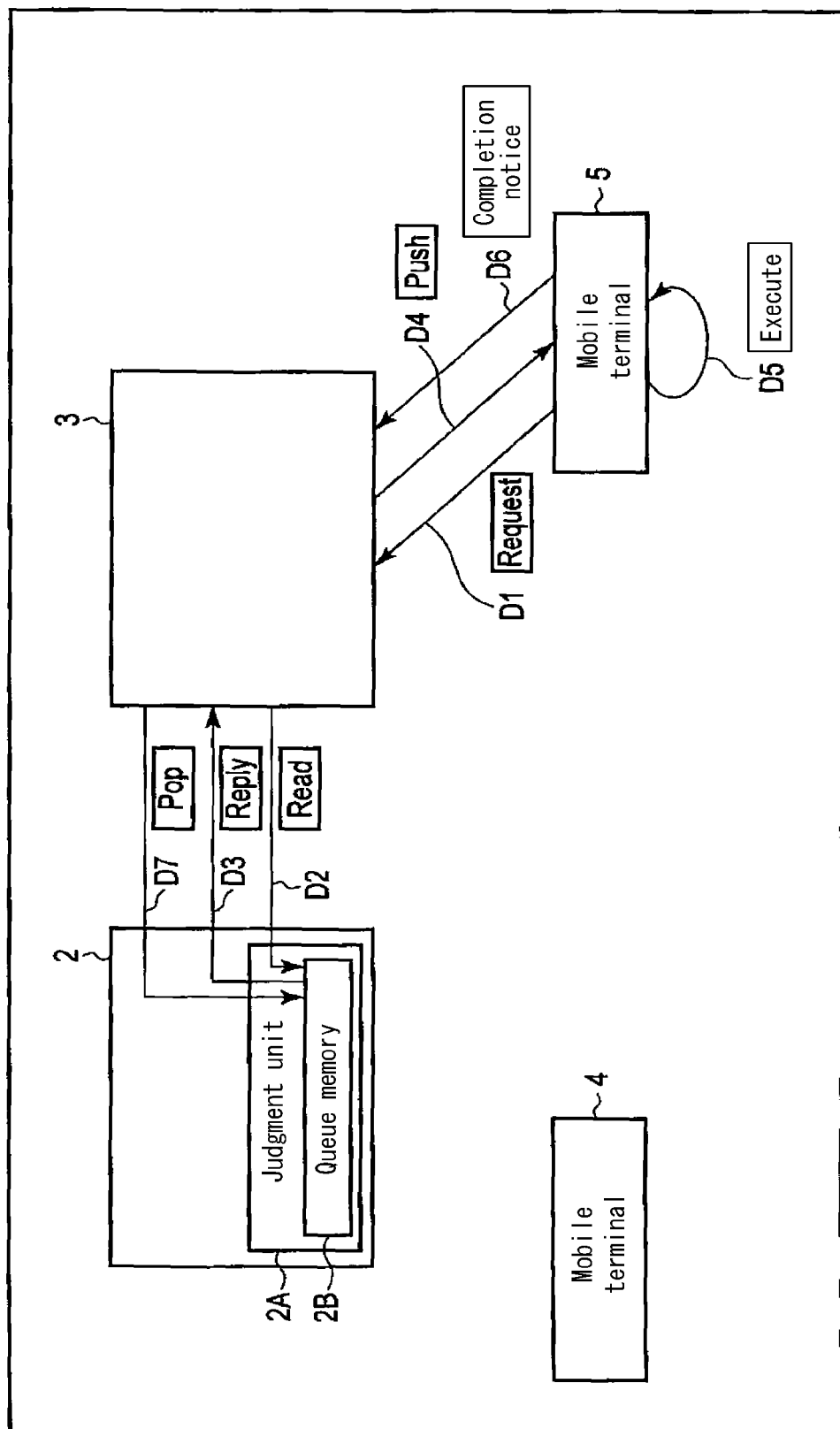
FIG. 14 illustrates an example of the processing path for event information in the situation that a mobile terminal has returned to the online state in the embodiment.
Figure 15A:
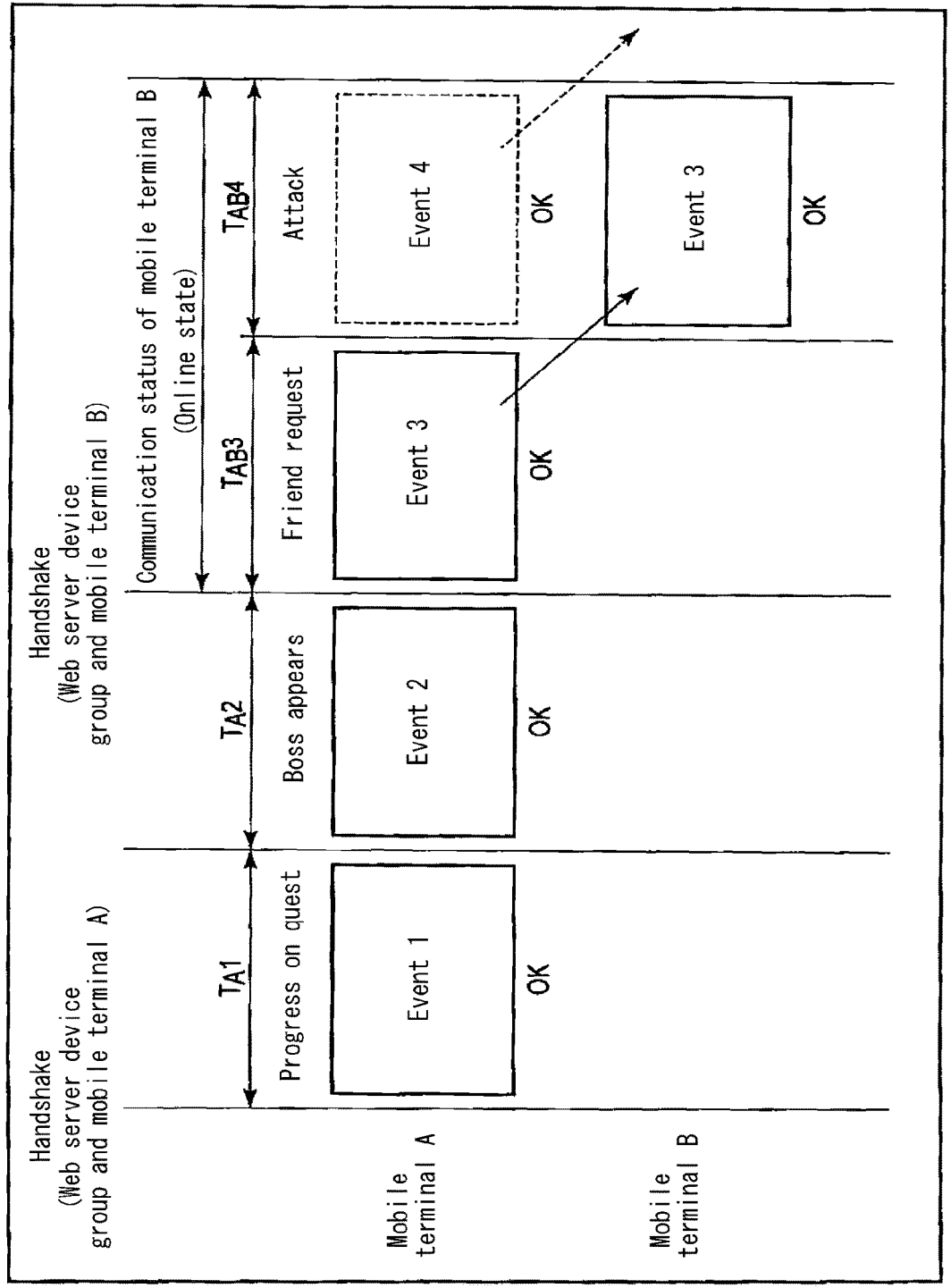
FIG. 15A illustrates a specific example of event information transmitted from mobile terminal A to mobile terminal B as a result of game progress in the embodiment.
Figure 15B:
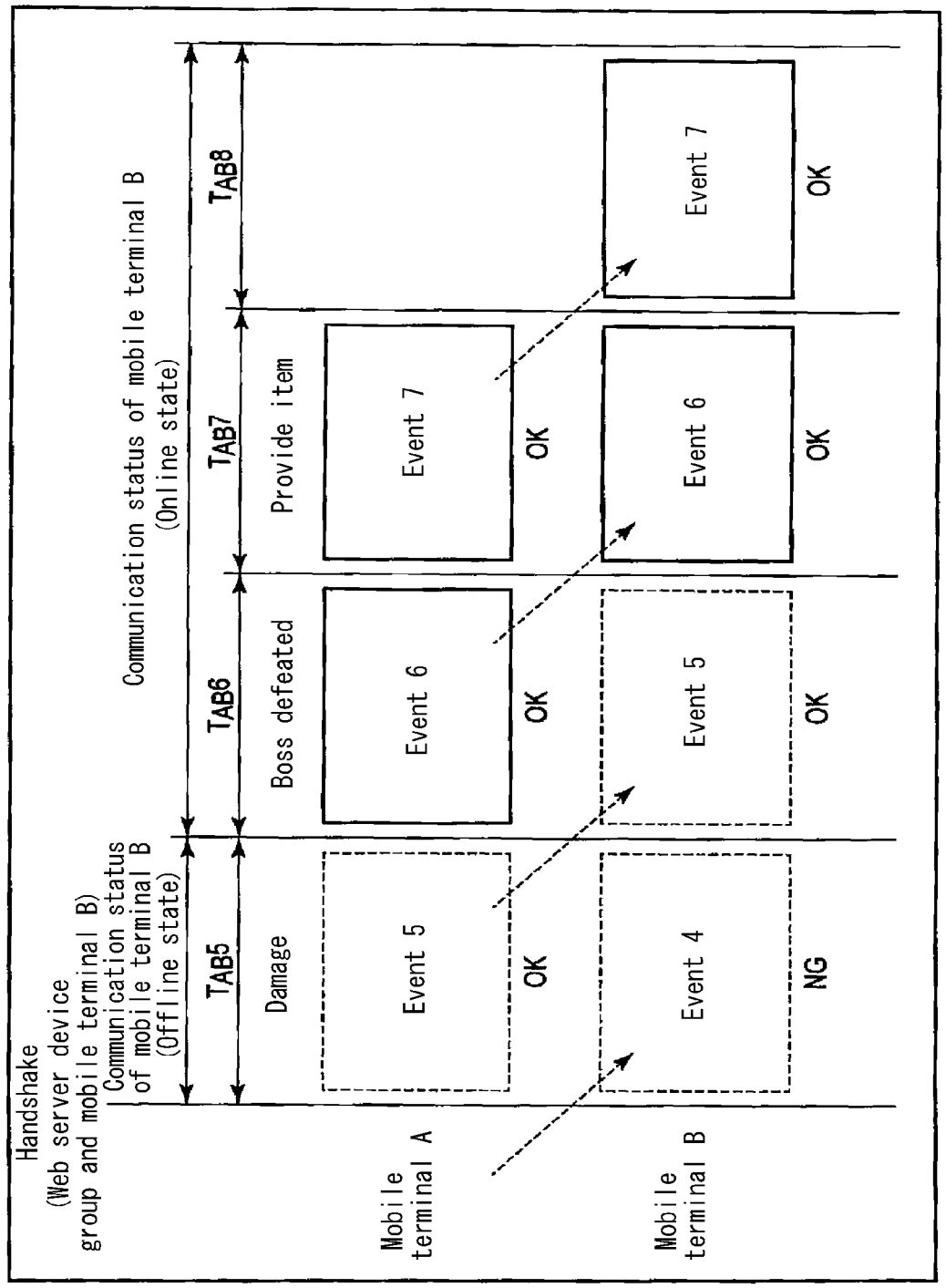
FIG. 15B illustrates a specific example of event information transmitted from mobile terminal A to mobile terminal B as a result of game progress in the embodiment.

FIG. 13 illustrates an example of the processing path for event information in the situation that the mobile terminal 5 is in a temporary offline state, FIG. 14 illustrates an example of the processing path for event information in the situation that the mobile terminal 5 has returned to the online state, and FIGS. 15A and 15B illustrate a specific example of event information transmitted from mobile terminal A to mobile terminal B as a result of game progress.

Note that processing for events 1, 2, and 3 in FIG. 15A is executed in the same way as for events 1, 2, and 3 in FIG. 11A, and therefore a description thereof is omitted. In other words, the event information for event 3 is transmitted from the mobile terminal 4 to the mobile terminal 5 in a state allowing for transmission and reception of data via Web-Socket by the web server devices 2 and 3 and the mobile terminals 4 and 5.

Here, assume that event 4 occurs on the mobile terminal 4 (TAB 4 in FIG. 15A). The mobile terminal 4 transmits event information for event 4 to the web server device 2 (C1: Send). The determination unit 2A of the web server device 2 determines that the content of the event information for event 4 does not relate to the game status of the mobile terminal 5. Accordingly, the event information for event 4 is transmitted from the web server device 2 to the web server device 3 without being stored in the queue memory 2B (C32: Publish). Since the mobile terminal 5 is in an offline state, however, the transmission from the web server device 3 to the mobile terminal 5 (C42: Publish) fails.

Next, assume that event 5 occurs on the mobile terminal 4 (TAB 5 in FIG. 15B). The mobile terminal 4 transmits event information for event 5 to the web server device 2 (C1: Send). The determination unit 2A of the web server device 2 determines that the content of the event information for event 5 does not relate to the game status of the mobile terminal 5. Accordingly, like the event information for event 5, the event information for event 4 is transmitted to the web server device 3 without being stored in the queue memory 2B. If the mobile terminal 5 returns to the online state during this time, the transmission from the web server device 3 to the mobile terminal 5 (C41: Publish) succeeds.

Figure 16:
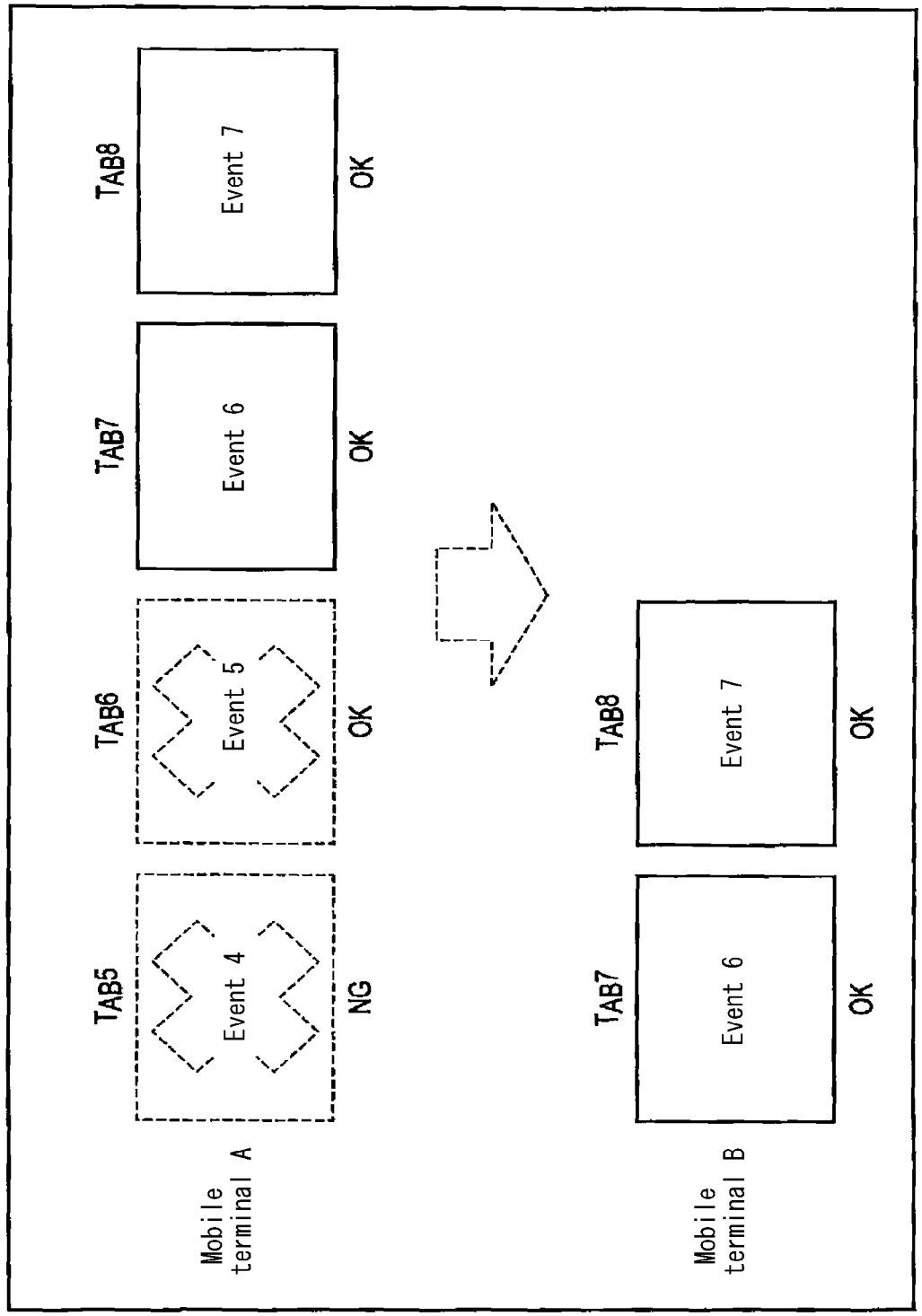
FIG. 16 illustrates an example of event information generated in a mobile terminal in the embodiment.

Once the mobile terminal 5 returns to the online state, the mobile terminal 5 enters a state allowing for transmission and reception of data with the mobile terminal 4 via Web-Socket. Accordingly, the event information for events 6 and 7 that occurred in the mobile terminal 4 (TAB 6 and TAB 7 in FIG. 15B) are stored in the queue memory 2B and transmitted to the mobile terminal 5. FIG. 16 illustrates an example of event information that is generated from event 4 onward on the mobile terminal 4 and is transmitted from the mobile terminal 4 to the mobile terminal 5. The mobile terminal 4 transmits event information for events 4 and 5 to the web server device 2. The event information for events 4 and 5 indicated by the dashed lines in FIG. 16, however, is determined not to relate to the game status of the mobile terminal 5. Accordingly, the event information for events 4 and 5 is not stored in the queue memory 2B of the web server device 2, and only the event information for events 7 and 8 is stored.

When event information determined by the determination unit 2A not to relate to the game status of the mobile terminal 5 is not transmitted to the mobile terminal 5, transmission from the web server device 2 to the web server device 3 (C32: Publish) and transmission from the web server device 3 to the mobile terminal 5 (C42: Publish) are omitted. Therefore, the mobile terminal 5 is not affected even when in the offline state.

Here, for example the event information for event 4 is described as being determined to relate to the game status of the mobile terminal 5.

Here, assume that communication between the mobile terminal 5 and the web server device 3 is cut off, and that as illustrated in FIG. 13, the mobile terminal 5 is in an offline state. In this case, the mobile terminal 5 cannot transmit or receive data via WebSocket. Accordingly, transmission of event information from the web server device 3 to the mobile terminal 5 (C41: Publish) results in an error.

In this case, for example when there is no notification via a pop operation within a predetermined period of time after transmitting event information to the web server device 3, the determination unit 2A of the web server device 2 determines that transmission of position information to the mobile terminal 5 failed. In this case, the determination unit 2A adds information indicating that transmission of the event information failed to the event information for event 4 stored in the web server device 3.

Next, assume that the mobile terminal 5 reconnects to the web server device 3, returning to the online state. In this case, the mobile terminal 5 outputs, to the web server device 3, a transmission request for event information from the mobile terminal 4 that is participating in the same online game, as illustrated in FIG. 14 (D1: Request).

In response to the transmission request for event information transmitted from the mobile terminal 5 upon returning online, the web server device 3 requests that the web server device 2 (determination unit 2A) read the event information stored in the queue memory 2B of the web server device 2 (D2: Read).

In response to the request from the web server device 3 to read event information, the determination unit 2A of the web server device 2 returns, to the web server device 3, the event information to which has been added the information indicating that transmission of the event information failed (D3: Reply). The web server device 3 transmits the event information returned from the web server device 2 to the mobile terminal 5 by a push operation (D4: Push).

The mobile terminal 5 executes game processing based on the content of the event information received from the web server device 3 to reflect the event that occurred on the mobile terminal 4 (D5: Execute). In order to provide notification that the event information received from the web server device 3 has been reflected in the game processing, the mobile terminal 5 sends a completion notice to the web server device 3 (D6: Completion notice).

In response to the completion notice from the mobile terminal 5, the web server device 3 notifies the web server device 2 via a pop operation (D7: Pop). In response to the notification via the pop operation, the determination unit 2A of the web server device 2 deletes the event information that was stored in the queue memory 2B and transmitted when the mobile terminal 5 was in an offline state.

In this way, even when the mobile terminal 5 is temporarily in an offline state, the event information stored in the queue memory 2B of the web server device 2 is transmitted to the mobile terminal 5 when the mobile terminal 5 returns online and is reflected in the game processing of the mobile terminal 5. As a result, the game processing of the online game executed on the mobile terminals 4 and 5 can be synchronized.

Note that in FIGS. 10, 13, and 14, the event information is transmitted from the mobile terminal 4 to the mobile terminal 5 via the two web server devices 2 and 3, yet a configuration may be adopted in which the event information is transmitted from the mobile terminal 4 to the mobile terminal 5 via three or more web server devices. In this case, the web server device other than the web server device 2 to which the mobile terminal 4 is connected may be configured to execute the above-described processing (including the processing executed by the determination unit 2A).

FIGS. 17A, 17B, 18A, and 18B illustrate examples of the generation of event information in a battle game. These drawings illustrate an example of a game in which the user develops a plurality of controllable characters in the game by moving the characters and battling other characters as necessary.

Figure 17A:
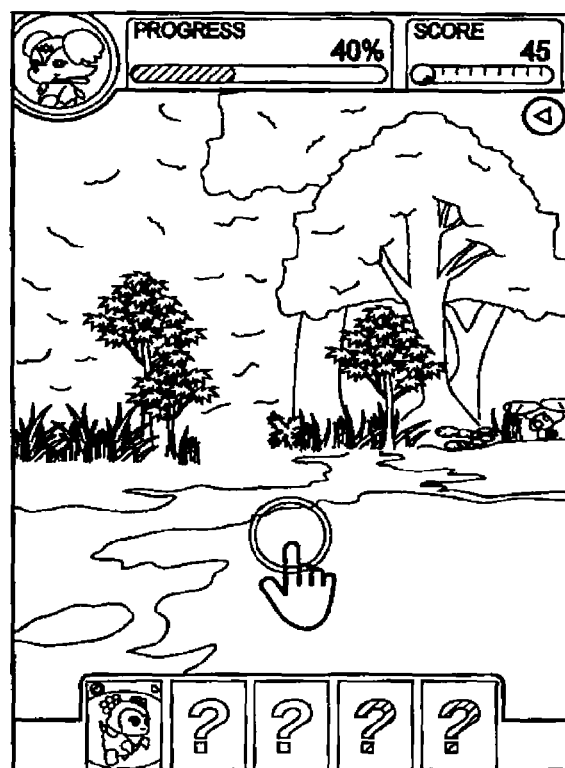
FIG. 17A illustrates an example of event information generated in a battle game according to the embodiment.

The upper portion of the screen in FIG. 17A shows the character used in the lead, the degree of progress (on a preset path) in the game (PROGRESS), and the score at that point in time (SCORE). The bottom portion of the screen shows that of the five remaining characters, only one is retained. The majority of the screen in the middle shows progression "through the woods" during the game.

Figure 17B:
FIG. 17B illustrates an example of event information generated in a battle game according to the embodiment.

FIG. 17B shows a state of greater progress than the state in FIG. 17A. In this case, even though the degree of progress in the game space has increased while offline, the score has not changed. Therefore, such event information is valid when later returning to the online state, and as illustrated in FIG. 7, processing may be executed for the event information to be valid for other players in the online game.

Figure 18A:
FIG. 18A illustrates an example of event information generated in a battle game according to the embodiment.

FIG. 18A shows a state of greater progress in the game space than the state in FIG. 17B. In this case as well, even though the degree of progress has increased while offline, the score has not changed. Therefore, such event information is valid when later returning to the online state, and as illustrated in FIG. 9, processing may be executed for the event information to be valid for other players in the online game.

Figure 18B:
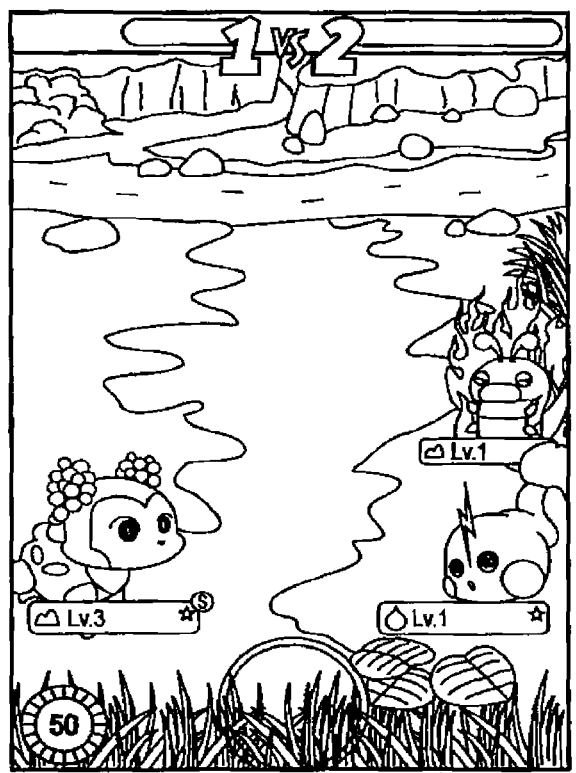
FIG. 18B illustrates an example of event information generated in a battle game according to the embodiment.

FIG. 18B shows a state of greater progress than the state in FIG. 18A. In this state, a battle is held with other characters that have appeared. In this case, in terms of game progress, a battle can be held even in an offline state, yet it is highly likely that the score will greatly change as a result of the battle, leading to inconsistency with other terminals battling in an online state.

Therefore, such event information is treated as invalid upon later returning to the online state, and control is performed via the verification processing by the web server devices 2 and 3 described in FIG. 8 so as to go back to the original online state.

As described above in detail, according to the present embodiment, centralized information management by a large-scale server device that uses a database is unnecessary when comprehensively controlling an online game, thereby reducing the processing load on each device during online communication and allowing for continued processing in an offline environment.

Furthermore, in the above embodiment, not only the time information P1 but also the position information P2 in the event information is referred to as the standard for verification, thus allowing for reliable game control by detecting a state in which it is highly likely that illegitimate operations are being performed, such as when the position of the terminal exhibits an unnaturally large change before and after the offline state.

Furthermore, for events that are found to be invalid as a result of verification, identifying information indicating the invalidity is returned in the above embodiment, so that synchronized game progress can reliably be maintained.

Furthermore, for event information that is transmitted and received between a plurality of mobile terminals participating in the online game, data traffic via WebSocket can be reduced by having the web server devices 2 and 3 determine whether to transmit the event information to other mobile terminals and then transmit only the event information determined affirmatively.

The case of conducting the online game with two mobile terminals, such as a smart phone, has been described in the above embodiment, yet the number of terminals is not limited in the present disclosure. Furthermore, the content of the game is not limited to the battle game illustrated in FIGS. 17A, 17B, 18A, and 18B.

In the above embodiment, an example of using the WebSocket standard has been described, yet communication between the web server and the browser in the present disclosure is not limited and may use another standard.

Additionally, the present disclosure is not limited to the above-described embodiment, and the present disclosure may be embodied with a variety of modifications without departing from the scope thereof. The functions executed in the above-described embodiment may also, in so far as possible, be combined appropriately. Various stages are included in the above-described embodiment, and a variety of embodiments may be abstracted by appropriately combining the plurality of disclosed constituent elements. For example, if results are still obtained even when removing some of the constituent elements from the constituent elements disclosed in the above embodiment, a configuration with those constituent elements removed may be abstracted as an embodiment.

What is claimed is:

1. A method of synchronizing an online game between a first mobile device and a second mobile device via a server, the method comprising:
   causing the first mobile device to provide, on a user interface of the first mobile device, at least one gameplay element;
   receiving, from the first mobile device connected online, first information related to a user interaction with the at least one gameplay element, said first information comprising at least one of a change in a degree of progress or a change in score;
   storing the first information;
   determining whether the first information is valid, wherein determining whether the first information is valid comprises determining whether a loss of synchronization of the online game between the first mobile device and the second mobile device would result from a transmission of the first information to the second mobile device;
   transmitting the first information to the second mobile device when it is determined that the first information is valid; and
   invalidating the first information and not transmitting the first information to the second mobile device when it is determined that the first information is not valid.

2. The method of claim 1, wherein a step of causing the first mobile device to provide the at least one gameplay element comprises providing, to the first mobile device, when the first mobile device is in an online state, information for causing the first mobile device to provide the at least one gameplay element during a condition in which the first mobile device is subsequently operated in an offline state; and
   wherein the first information related to the user interaction comprises information related to at least one interaction received by the first mobile device during the condition in which the first mobile device is in the offline state.

3. The method of claim 1, wherein the user interaction with the at least one gameplay element comprises advancing the degree of progress of a user character along a fixed path.

4. The method of claim 1, wherein the user interaction with the at least one gameplay element comprises initiating a battle between a user character and at least one opponent character.

5. The method of claim 4, further comprising providing the change in score based on an outcome of the battle.

6. The method of claim 1, further comprising displaying, on the user interface of the first mobile device, an interface element corresponding to the degree of progress, said interface element comprising at least one of a progress bar or a percentage.

7. The method of claim 1, wherein determining whether the first information is valid comprises:
   determining whether the first information includes the change in score; and
   when the first information includes the change in score, determining that the loss of synchronization would result based on the change in score.

8. A method of synchronizing an online game between a first mobile device and a server, the method comprising:
   providing, on a user interface of the first mobile device, at least one gameplay element;

receiving, from a user of the first mobile device, at least one user interaction with the at least one gameplay element, said at least one user interaction resulting in at least one of a change in a degree of progress or a change in score;

providing, to the server, from the first mobile device, during an online state, first information related to the at least one user interaction, said first information comprising the at least one of the change in the degree of progress or the change in score;

receiving, from the server, an indication of whether the first information has been determined to be valid as requiring no loss of synchronization of the online game, or whether the first information has been determined to be invalid as requiring a loss of synchronization of the online game;

maintaining the at least one of the change in the degree of progress or the change in score when the indication from the server provides that the first information is valid; and reverting an online game state of the first mobile device to an earlier state when the indication from the server provides that the first information is not valid.

9. The method of claim 8, wherein a step of providing, on the user interface of the first mobile device, the at least one gameplay element is performed in an offline state; and
wherein a step of providing, to the server, the first information is performed during a next online state after an end of the offline state.

10. The method of claim 8, wherein the user interaction with the at least one gameplay element comprises advancing the degree of progress of a user character along a fixed path.

11. The method of claim 8, wherein the user interaction with the at least one gameplay element comprises initiating a battle between a user character and at least one opponent character.

12. The method of claim 11, further comprising providing the change in score based on an outcome of the battle.

13. The method of claim 8, further comprising displaying, on the user interface of the first mobile device, an interface element corresponding to the degree of progress, said interface element comprising at least one of a progress bar or a percentage.

14. The method of claim 8, further comprising:
determining whether, upon transitioning from an offline state to the online state, the at least one user interaction resulting in the change in score has occurred; and
determining that the first information is invalid based on said determination.

15. A non-transitory computer readable medium including computer program instructions, which when executed by a server configured to exchange information related to game processing in an online game between a first client device and a second client device, cause circuitry of the server to perform steps of:
causing the first client device to provide, on a user interface of the first client device, at least one gameplay element;

receiving, from the first client device connected online, first information related to a user interaction with the at least one gameplay element, said first information comprising at least one of a change in a degree of progress or a change in score;

storing the first information;

determining whether the first information is valid, wherein determining whether the first information is valid comprises determining whether a loss of synchronization of the online game between the first client device and the second client device would result from a transmission of the first information to the second mobile device;

transmitting the first information to the second client device when it is determined that the first information is valid; and invalidating the first information and not transmitting the first information to the second client device when it is determined that the first information is not valid.

16. The non-transitory computer-readable medium of claim 15, wherein a step of causing the first client device to provide the at least one gameplay element comprises providing, to the first client device, when the first client device is in an online state, information for causing the first client device to provide the at least one gameplay element during a condition in which the first client device is subsequently operated in an offline state; and
wherein the first information related to the user interaction comprises information related to at least one interaction received by the first client device during the condition in which the first client device is in the offline state.

17. The non-transitory computer-readable medium of claim 15, wherein the user interaction with the at least one gameplay element comprises advancing the degree of progress of a user character along a fixed path.

18. The non-transitory computer-readable medium of claim 15, wherein the user interaction with the at least one gameplay element comprises initiating a battle between a user character and at least one opponent character.

19. The non-transitory computer-readable medium of claim 15, wherein the circuitry of the server is further configured to perform a step of displaying, on the user interface of the first client device, an interface element corresponding to the degree of progress, said interface element comprising at least one of a progress bar or a percentage.

20. The non-transitory computer-readable medium of claim 15, wherein determining whether the first information is valid comprises:
determining whether the first information includes the change in score; and
when the first information includes the change in score, determining that the loss of synchronization would result based on the change in score.

* * * * *